(12) United States Patent
Mizuno

(10) Patent No.: US 11,801,826 B2
(45) Date of Patent: Oct. 31, 2023

(54) VEHICLE CONTROL APPARATUS

(71) Applicant: SUBARU CORPORATION, Tokyo (JP)

(72) Inventor: Shuuto Mizuno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/887,080

(22) Filed: Aug. 12, 2022

(65) Prior Publication Data
US 2023/0071073 A1    Mar. 9, 2023

(30) Foreign Application Priority Data

Sep. 8, 2021    (JP) .................. 2021-146254

(51) Int. Cl.
*B60W 30/02*    (2012.01)
*B60W 10/14*    (2012.01)
(Continued)

(52) U.S. Cl.
CPC ............. *B60W 30/02* (2013.01); *B60K 23/08* (2013.01); *B60L 3/10* (2013.01); *B60L 15/20* (2013.01); *B60W 10/08* (2013.01); *B60W 10/14* (2013.01); *B60W 40/068* (2013.01); *B60T 8/1763* (2013.01); *B60T 2210/12* (2013.01); *B60W 2520/263* (2013.01); *B60W 2552/40* (2020.02);
(Continued)

(58) Field of Classification Search
None
See application file for complete search history.

(56) References Cited

U.S. PATENT DOCUMENTS 9,463,697 B1 * 10/2016 Gauthier ................. B60L 15/20
2002/0087251 A1 * 7/2002 Kogure .................. G01N 19/02
701/80
(Continued)

FOREIGN PATENT DOCUMENTS

DE    102018119359 A1 *  2/2019    .............. B60T 8/175
JP    2011-229286 A    11/2011
(Continued)

OTHER PUBLICATIONS

Machine translation of DE102018119359 (Year: 2019).*

*Primary Examiner* — Christian Chace
*Assistant Examiner* — Scott R Jagolinzer
(74) *Attorney, Agent, or Firm* — McDermott Will & Emery LLP

(57) ABSTRACT

A vehicle control apparatus to be applied to a vehicle includes a first traveling motor, a second traveling motor, and a control system. The control system estimates a first friction coefficient between a first wheel and a road surface and a second friction coefficient between a second wheel and a road surface. When the vehicle starts in a situation in which any of the first and second friction coefficients is less than a first threshold and a difference between the first and second friction coefficients is greater than a second threshold, the control system increases a power running torque of the first traveling motor after elapse of a first delay time after increasing a power running torque of the second traveling motor, if the first friction coefficient is smaller than the second friction coefficient. The first delay time is set on the basis of the first friction coefficient.

15 Claims, 16 Drawing Sheets

(51) Int. Cl.
  *B60W 40/068* (2012.01)
  *B60K 23/08* (2006.01)
  *B60W 10/08* (2006.01)
  *B60L 15/20* (2006.01)
  *B60L 3/10* (2006.01)
  *B60T 8/1763* (2006.01)
(52) U.S. Cl.
  CPC ... *B60W 2720/30* (2013.01); *B60W 2720/403* (2013.01)

(56) References Cited

U.S. PATENT DOCUMENTS

| | | | |
|---|---|---|---|
| 2013/0035838 A1* | 2/2013 | Maier | B60W 30/20 701/99 |
| 2013/0173100 A1* | 7/2013 | Takagi | B60L 3/0061 180/65.265 |
| 2015/0096814 A1* | 4/2015 | Maeda | B62D 11/24 180/6.28 |
| 2019/0168774 A1* | 6/2019 | Van Wiemeersch | B60R 25/33 |
| 2019/0291591 A1 | 9/2019 | Suzuki et al. | |
| 2022/0048516 A1* | 2/2022 | Erban | B60W 40/068 |
| 2023/0140485 A1* | 5/2023 | Nahidi | B60W 40/114 701/38 |

FOREIGN PATENT DOCUMENTS

| | | |
|---|---|---|
| JP | 2011-230543 A | 11/2011 |
| JP | 2018-093645 A | 6/2018 |

\* cited by examiner

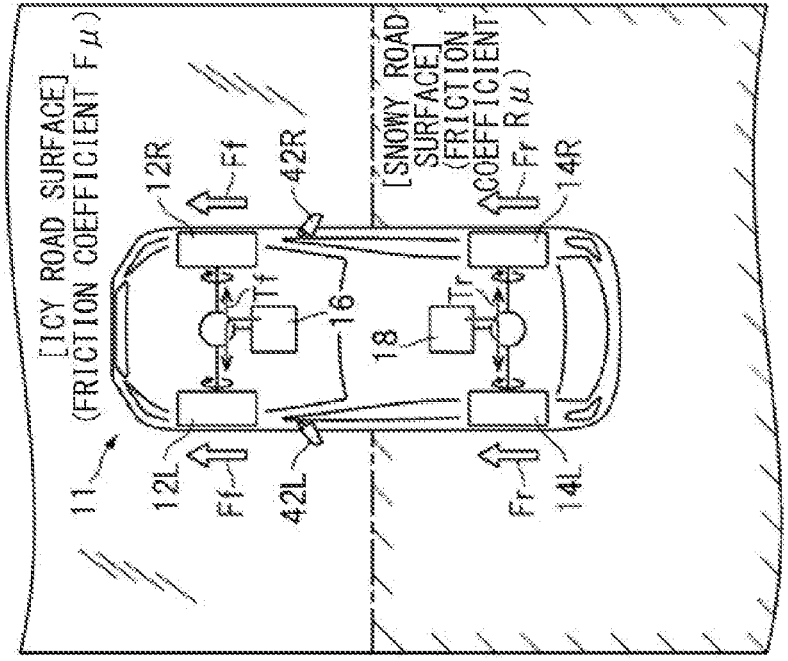
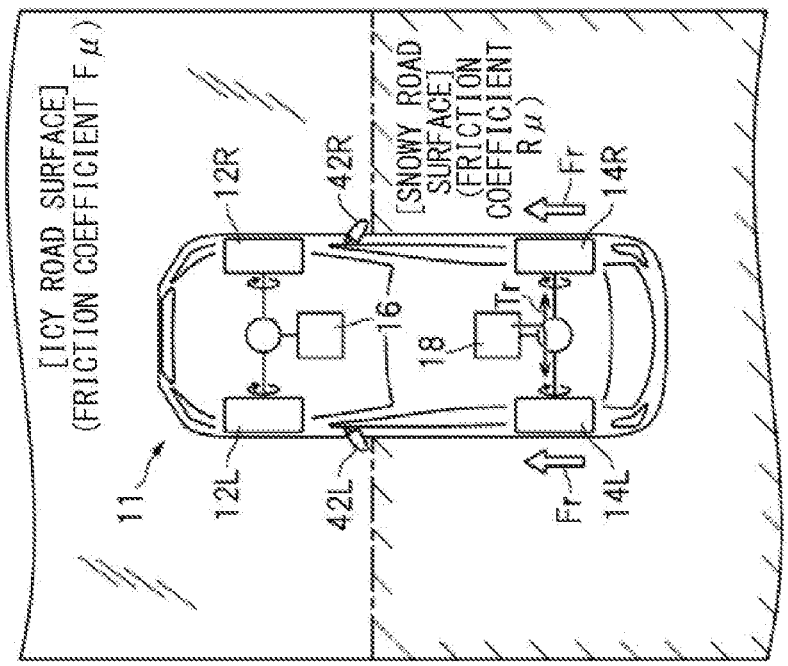
FIG. 10

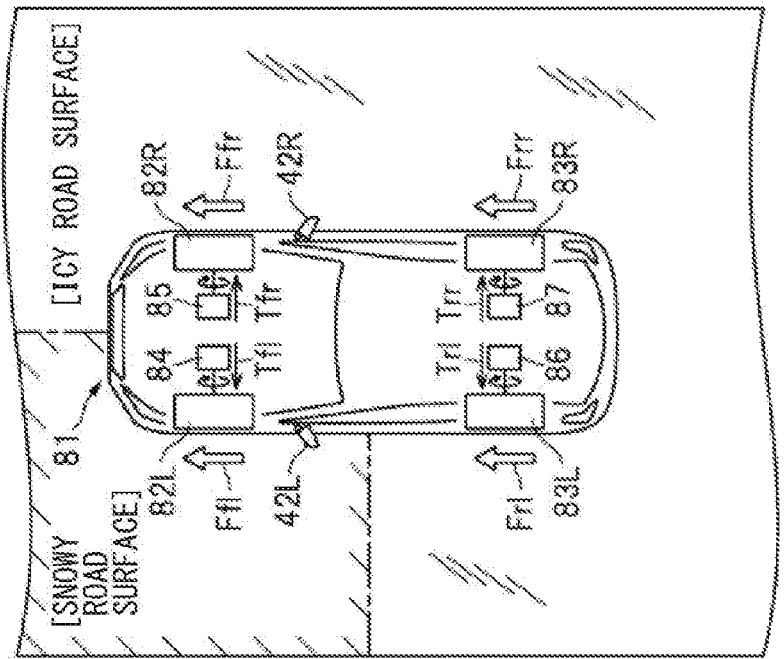
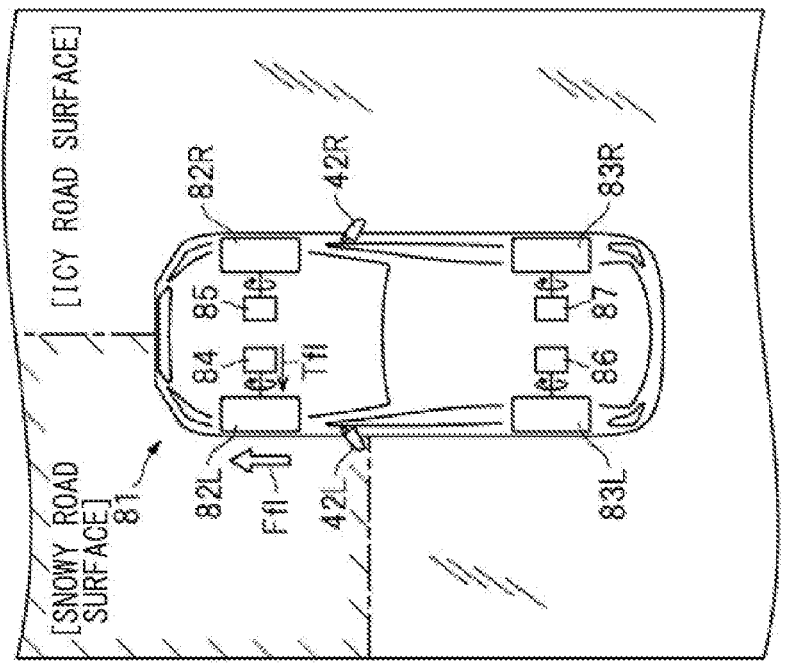
FIG. 16

VEHICLE CONTROL APPARATUS

CROSS-REFERENCE TO RELATED APPLICATIONS

The present application claims priority from Japanese Patent Application No. 2021-146254 filed on Sep. 8, 2021, the entire contents of which are hereby incorporated by reference.

BACKGROUND

The technology relates to a vehicle control apparatus to be applied to a vehicle.

A vehicle including a plurality of traveling motors as power sources has been developed. For example, reference is made to Japanese Unexamined Patent Application Publication Nos. 2011-229286, 2011-230543, and 2018-93645. Examples of such a vehicle include: a vehicle including a traveling motor coupled to front wheels and a traveling motor coupled to rear wheels; and a vehicle in which one traveling motor is coupled for each wheel.

SUMMARY

An aspect of the technology provides a vehicle control apparatus to be applied to a vehicle. The vehicle control apparatus includes a first traveling motor, a second traveling motor, and a control system. The first traveling motor is coupled to a first wheel of the vehicle. The second traveling motor is coupled to a second wheel of the vehicle. The control system includes a processor and a memory communicably coupled to each other. The control system is configured to control the first traveling motor and the second traveling motor. The control system is configured to estimate a first friction coefficient between the first wheel and a road surface and a second friction coefficient between the second wheel and a road surface. In a case where the vehicle starts in a situation in which the first friction coefficient, the second friction coefficient, or both are less than a first threshold and a difference between the first friction coefficient and the second friction coefficient is greater than a second threshold, the control system is configured to increase a power running torque of the first traveling motor after elapse of a first delay time after increasing a power running torque of the second traveling motor, in a case where the first friction coefficient is smaller than the second friction coefficient, and increase the power running torque of the second traveling motor after elapse of a second delay time after increasing the power running torque of the first traveling motor, in a case where the second friction coefficient is smaller than the first friction coefficient. The first delay time is set on the basis of the first friction coefficient. The second delay time is set on the basis of the second friction coefficient.

An aspect of the technology provides a vehicle control apparatus to be applied to a vehicle. The vehicle control apparatus includes a first traveling motor, a second traveling motor, and circuitry. The first traveling motor is coupled to a first wheel of the vehicle. The second traveling motor is coupled to a second wheel of the vehicle. The circuitry is configured to control the first traveling motor and the second traveling motor. The circuitry is configured to estimate a first friction coefficient between the first wheel and a road surface and a second friction coefficient between the second wheel and a road surface. In a case where the vehicle starts in a situation in which the first friction coefficient, the second friction coefficient, or both are less than a first threshold and a difference between the first friction coefficient and the second friction coefficient is greater than a second threshold, the circuitry is configured to increase a power running torque of the first traveling motor after elapse of a first delay time after increasing a power running torque of the second traveling motor, in a case where the first friction coefficient is smaller than the second friction coefficient, and increase the power running torque of the second traveling motor after elapse of a second delay time after increasing the power running torque of the first traveling motor, in a case where the second friction coefficient is smaller than the first friction coefficient. The first delay time is set on the basis of the first friction coefficient. The second delay time is set on the basis of the second friction coefficient.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 10 is a diagram illustrating the vehicle that is caused to start by the start torque suppression control.

FIG. 16 is a diagram illustrating the vehicle that is caused to start by the start torque suppression control.

DETAILED DESCRIPTION

Figure 1:
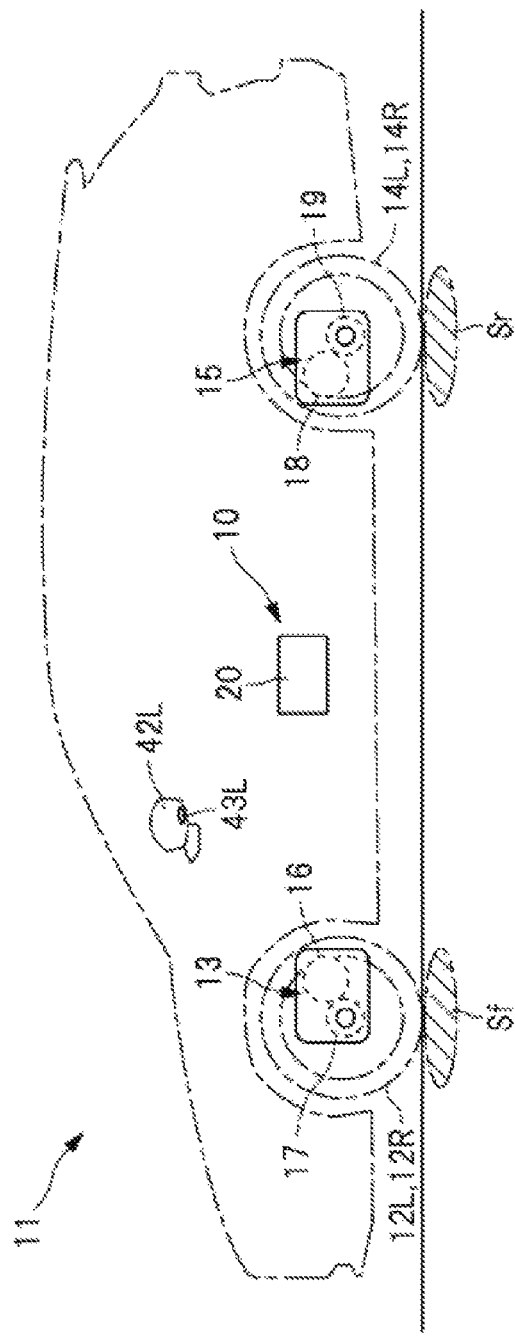
FIG. 1 is a diagram illustrating an example of a configuration of a vehicle provided with a vehicle control apparatus according to one example embodiment of the technology.

Torque of a traveling motor rises quickly. Accordingly, when a vehicle starts on a low-μ road, such as a snowy road surface or an icy road surface, an amount of slip of a motor-driven wheel can increase. Thus causing the wheel to greatly slip when the vehicle starts can result in an unstable vehicle behavior. It is thus desired to suppress wheel slip at the start of the vehicle.

It is desirable to provide a vehicle control apparatus that makes it possible to suppress wheel slip at a start of a vehicle.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale.

Throughout the present specification and the drawings, elements having substantially the same function and configuration are denoted with the same reference numerals to avoid any redundant description. In addition, elements that are not directly related to any embodiment of the technology are unillustrated in the drawings.

[Configuration of Vehicle]

FIG. 1 is a diagram illustrating an example of a configuration of a vehicle 11 provided with a vehicle control apparatus 10 according to an example embodiment of the technology. As illustrated in FIG. 1, the vehicle 11 may include a front drive unit 13 that drives front wheels 12L and 12R, and a rear drive unit 15 that drives rear wheels 14L and 14R. The front drive unit 13 may include a front motor 16 and a front differential 17. The rear drive unit 15 may include a rear motor 18 and a rear differential 19. As will be described later, the front wheels 12L and 12R may be coupled to the front motor 16 and the rear wheels 14L and 14R may be coupled to the rear motor 18. In one embodiment, the front wheels 12L and 12R may serve as a "first wheel". In one embodiment, the rear wheels 14L and 14R may serve as a "second wheel". In one embodiment, the front motor 16 may serve as a "first traveling motor". In one embodiment, the rear motor 18 may serve as a "second traveling motor".

Figure 2:
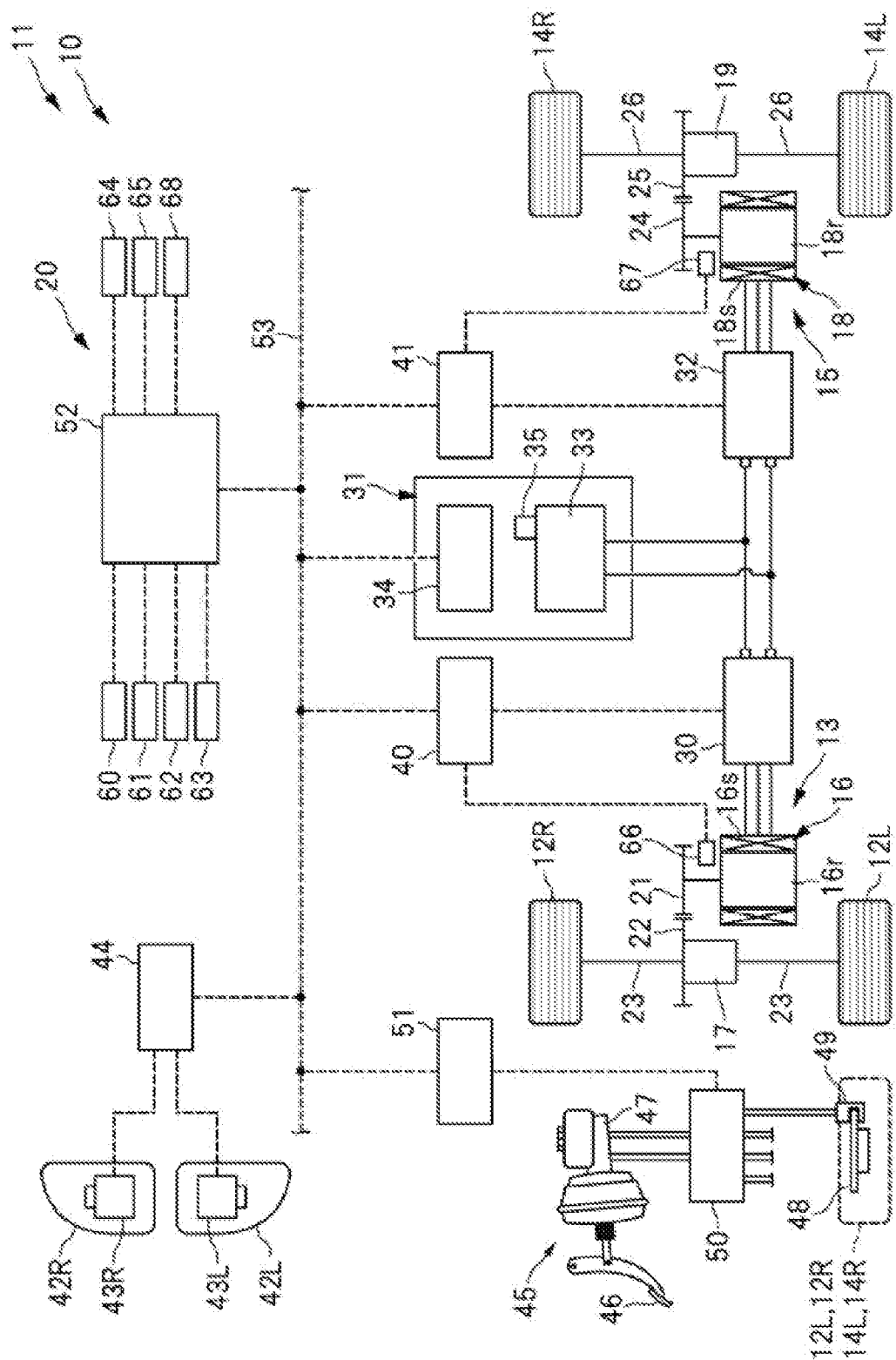
FIG. 2 is a diagram illustrating an example of a front drive unit, a rear drive unit, and a control system.

FIG. 2 is a diagram illustrating an example of the front drive unit 13, the rear drive unit 15, and the control system 20. As illustrated in FIG. 2, the front drive unit 13 may include the front motor 16 and the front differential 17. The front motor 16 may have a rotor 16r coupled to a drive gear 21. The drive gear 21 may be in mesh with a driven gear 22 fixed to the front differential 17. An axle 23 extending from the front differential 17 may be coupled to the front wheels 12L and 12R. Similarly, the rear drive unit 15 may include the rear motor 18 and the rear differential 19. The rear motor 18 may have a rotor 18r coupled to a drive gear 24. The drive gear 24 may be in mesh with a driven gear 25 fixed to the rear differential 19. An axle 26 extending from the rear differential 19 may be coupled to the rear wheels 14L and 14R.

The front motor 16 may have a stator 16s coupled to an inverter 30. The inverter 30 may be coupled to a battery pack 31. Similarly, the rear motor 18 may have a stator 18s coupled to an inverter 32. The inverter 32 may be coupled to the battery pack 31. The battery pack 31 may include a battery module 33 including a plurality of battery cells, and a battery control unit 34 that monitors charging and discharging of the battery module 33. The battery pack 31 may also include a battery sensor 35 that detects, for example, a charging/discharging current and a terminal voltage. The battery control unit 34 may calculate a state of charge (SOC) of the battery module 33 on the basis of, for example, the charging/discharging current and the terminal voltage detected by the battery sensor 35. Note that the SOC of the battery module 33 may refer to a rate indicating the remaining amount of electric power that is stored in the battery module 33. The SOC of the battery module 33 may be the rate of a charged amount to the full charge capacity of the battery module 33.

A front motor control unit 40 may be coupled to the inverter 30 to control the front motor 16 via the inverter 30. The front motor control unit 40 may control the inverter 30 that includes, for example, a plurality of switching devices to control an electric conduction state of the stator 16s and thereby to control a motor torque, i.e., a power running torque or a regenerative torque, of the front motor 16. In controlling the front motor 16 to be in a power running state, electric power may be supplied from the battery module 33 to the stator 16s via the inverter 30. In controlling the front motor 16 to be in an electric power generating state, electric power may be supplied from the stator 16s to the battery module 33 via the inverter 30.

Similarly, a rear motor control unit 41 may be coupled to the inverter 32 to control the rear motor 18 via the inverter 32. The rear motor control unit 41 may control the inverter 32 that includes, for example, a plurality of switching devices to control an electric conduction state of the stator 18s and thereby to control a motor torque, i.e., a power running torque or a regenerative torque, of the rear motor 18. In controlling the rear motor 18 to be in a power running state, electric power may be supplied from the battery module 33 to the stator 18s via the inverter 32. In controlling the rear motor 18 to be in an electric power generating state, electric power may be supplied from the stator 18s to the battery module 33 via the inverter 32.

Side-view mirrors 42L and 42R of the vehicle 11 may respectively be provided with left and right camera modules 43L and 43R. The camera modules 43L and 43R may perform imaging of road surfaces with which the front wheels 12L and 12R and the rear wheels 14L and 14R come into contact. The camera modules 43L and 43R may be coupled to a camera control unit 44. The camera control unit 44 may cause the camera modules 43L and 43R to perform imaging of each of the road surfaces with which the front wheels 12L and 12R and the rear wheels 14L and 14R are in contact when the vehicle is stopped. The camera control unit 44 may execute image analysis of imaging data to determine a road surface situation. Further, on the basis of the road surface situation of each road surface (e.g., a dry road surface, a wet road surface, a snowy road surface, or an icy road surface), the camera control unit 44 may estimate a friction coefficient between the front wheels 12L and 12R and the road surface in contact with the front wheels 12L and 12R, and estimate a friction coefficient between the rear wheels 14L and 14R and the road surface in contact with the rear wheels 14L and 14R.

The vehicle 11 may include a brake device 45 that puts a brake on the front wheels 12L and 12R and the rear wheels 14L and 14R. The brake device 45 may include a master cylinder 47 that outputs a brake fluid pressure in conjunction with a brake pedal 46, and calipers 49 that put a brake on disc rotors 48 of the respective front wheels 12L and 12R and rear wheels 14L and 14R. Between the master cylinder 47 and the calipers 49 may be a brake actuator 50 that controls the brake fluid pressure to be supplied to each of the calipers 49. The brake actuator 50 may include unillustrated devices including, for example, an electric pump, an accumulator, and an electromagnetic valve.

The brake actuator 50 may be coupled to a brake control unit 51. The brake control unit 51 may determine a tendency of locking of the front wheels 12L and 12R and the rear wheels 14L and 14R upon braking or a tendency of slipping of the front wheels 12L and 12R and the rear wheels 14L and 14R upon acceleration. In a case where the brake control unit 51 determines that the front wheels 12L and 12R and the rear wheels 14L and 14R have the tendency of locking, the brake control unit 51 may reduce braking force on the front wheels 12L and 12R and the rear wheels 14L and 14R to resolve the tendency of locking. In a case where the brake control unit 51 determines that the front wheels 12L and 12R and the rear wheels 14L and 14R have the tendency of slipping, the brake control unit 51 may increase the braking force on the front wheels 12L and 12R and the rear wheels 14L and 14R to resolve the tendency of slipping. For example, the brake control unit 51 may adjust the braking force on the front wheels 12L and 12R and the rear wheels 14L and 14R to resolve the tendency of locking or the tendency of slipping of the front wheels 12L and 12R and the rear wheels 14L and 14R, by adjusting the brake fluid pressure by controlling the brake actuator 50.

[Control System]

The vehicle control apparatus 10 includes a control system 20 that controls units including, for example, the front drive unit 13 and the rear drive unit 15 and includes a plurality of electronic control units. The control system 20 may include the electronic control units including the battery control unit 34, the front motor control unit 40, the rear motor control unit 41, the camera control unit 44, and the brake control unit 51 described above. The control system 20 may include the electronic control units including a vehicle control unit 52 that outputs a control signal to each of the battery control unit 34, the front motor control unit 40, the rear motor control unit 41, the camera control unit 44, and the brake control unit 51. The battery control unit 34, the front motor control unit 40, the rear motor control unit 41, the camera control unit 44, the brake control unit 51, and the vehicle control unit 52 may be communicably coupled to each other via an in-vehicle network 53, such as a controller area network (CAN) or a local interconnect network (LIN). The vehicle control unit 52 may set operation targets of respective devices including, for example, the front motor 16 and the rear motor 18, on the basis of input information obtained from various control units including the battery control unit 34, the front motor control unit 40, the rear motor control unit 41, the camera control unit 44, and the brake control unit 51 and various sensors to be described later. The vehicle control unit 52 may generate the control signals that are based on the operation targets of the respective devices including, for example, the front motor 16 and the rear motor 18, and output the control signals to the respective various control units including the battery control unit 34, the front motor control unit 40, the rear motor control unit 41, the camera control unit 44, and the brake control unit 51.

The vehicle control unit 52 may be coupled to the sensors including an accelerator sensor 60, a brake sensor 61, a wheel speed sensor 62, a wheel speed sensor 63, a wheel speed sensor 64, and a wheel speed sensor 65. The accelerator sensor 60 may detect how an accelerator pedal is operated. The brake sensor 61 may detect how the brake pedal 46 is operated. The wheel speed sensor 62 may detect a rotation speed of the left front wheel 12L. The wheel speed sensor 63 may detect a rotation speed of the right front wheel 12R. The wheel speed sensor 64 may detect a rotation speed of the left rear wheel 14L. The wheel speed sensor 65 may detect a rotation speed of the right rear wheel 14R. The front motor control unit 40 may be coupled to a sensor such as a motor rotation sensor 66, such as a resolver, that detects a rotation speed of the front motor 16. The rear motor control unit 41 may be coupled to a sensor such as a motor rotation sensor 67, such as a resolver, that detects a rotation speed of the rear motor 18. Further, the vehicle control unit 52 may be coupled to a start switch 68 that is to be operated by a driver who drives the vehicle 11 in starting up the control system 20.

Figure 3:
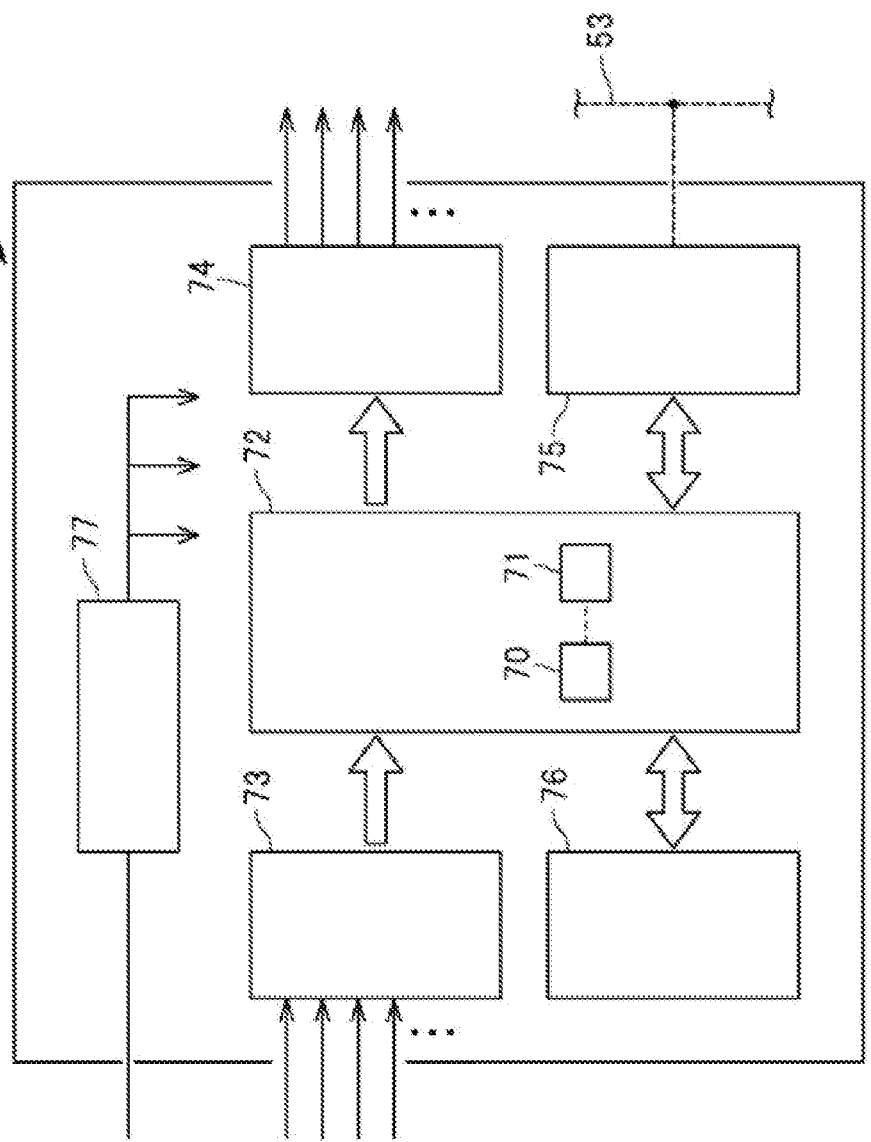
FIG. 3 is a diagram schematically illustrating a basic configuration of each control unit.

FIG. 3 is a diagram schematically illustrating a basic configuration of each of the battery control unit 34, the front motor control unit 40, the rear motor control unit 41, the camera control unit 44, the brake control unit 51, and the vehicle control unit 52. As illustrated in FIG. 3, the battery control unit 34, the front motor control unit 40, the rear motor control unit 41, the camera control unit 44, the brake control unit 51, and the vehicle control unit 52 each may include a microprocessor 72 that includes devices including, for example, a processor 70 and a memory 71. The memory 71 may hold a predetermined program. The processor 70 may execute a command set of the program. The processor 70 and the memory 71 are communicably coupled to each other. FIG. 3 illustrates an example in which the microprocessor 72 includes one processor 70 and one memory 71, although a configuration of the microprocessor 72 is not limited thereto. In some embodiments, the microprocessor 72 may include a plurality of processors 70. In some embodiments, the microprocessor 72 may include a plurality of memories 71.

The battery control unit 34, the front motor control unit 40, the rear motor control unit 41, the camera control unit 44, the brake control unit 51, and the vehicle control unit 52 each may include devices including, for example, an input conversion circuit 73, a drive circuit 74, a communication circuit 75, an external memory 76, and a power supply circuit 77. The input conversion circuit 73 may convert a signal received from various sensors into a signal receivable by the microprocessor 72. The drive circuit 74 may generate a drive signal to be supplied to actuators including, for example, the front motor 16 and the rear motor 18 described above, on the basis of a signal outputted from the microprocessor 72. The communication circuit 75 may convert a signal outputted from the microprocessor 72 into a communication signal directed to another control unit. The communication circuit 75 may also convert a communication signal received from another control unit into a signal receivable by the microprocessor 72. The power supply circuit 77 may supply a stable power supply voltage to each of devices including, for example, the microprocessor 72, the input conversion circuit 73, the drive circuit 74, the communication circuit 75, and the external memory 76. The external memory 76 may be, for example, a nonvolatile memory, and hold data or the like to be retained even upon no electric power conduction.

[Requested Driving Force]

Figure 4:
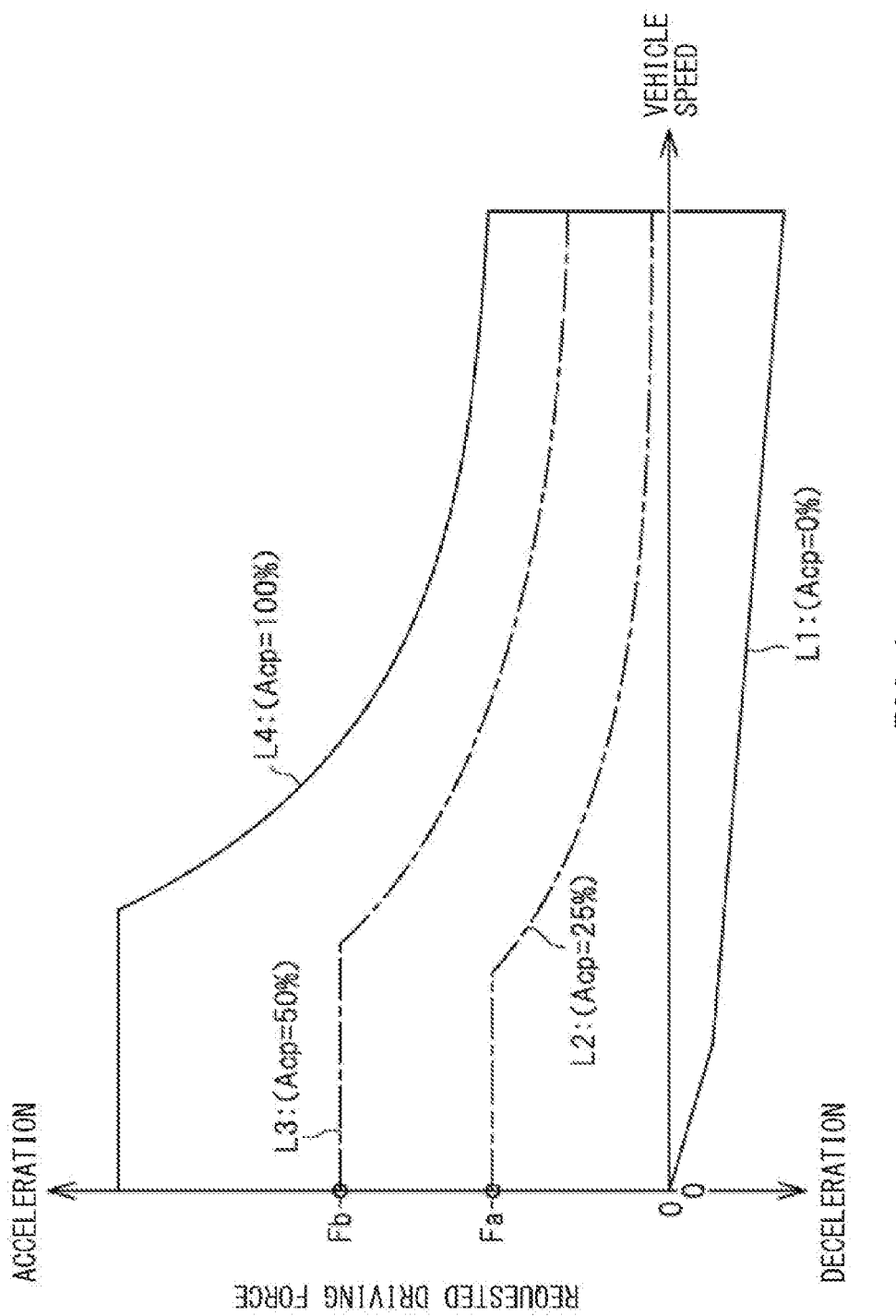
FIG. 4 is a diagram illustrating an example of a driving force map that illustrates a requested driving force.

FIG. 4 is a diagram illustrating an example of a driving force map that illustrates a requested driving force. As illustrated in FIG. 4, characteristic lines L1 to L4 each indicating the requested driving force for the corresponding accelerator position Acp may be set for the driving force map. For example, the vehicle control unit 52 may set the requested driving force for the vehicle 11 along the characteristic line L1 in a case where the accelerator position Acp is 0%, and may set the requested driving force for the vehicle 11 along the characteristic line L2 in a case where the accelerator position Acp is 25%. Similarly, the vehicle control unit 52 may set the requested driving force for the vehicle 11 along the characteristic line L3 in a case where the accelerator position Acp is 50%, and may set the requested driving force for the vehicle 11 along the characteristic line L4 in a case where the accelerator position Acp is 100%.

In an example case where the accelerator pedal is depressed to bring the accelerator position Acp to "25%" when the vehicle is stopped at a vehicle speed of "0", the vehicle control unit 52 may set "Fa" as the requested driving force. In an example case where the accelerator pedal is depressed to bring the accelerator position Acp to "50%" when the vehicle is stopped, the vehicle control unit 52 may set "Fb" as the requested driving force. Further, the vehicle control unit 52 may set a target motor torque T1 of each of the front motor 16 and the rear motor 18 to allow "Fa" or "Fb" to be obtained as the requested driving force. Note that four characteristic lines L1 to L4 are set for the driving force map illustrated in an example of FIG. 4 for easier description, although the number of characteristic lines is not limited thereto. In some embodiments, five or more characteristic lines may be set for the driving force map.

[Start of Vehicle on Low-μ Road]

When the vehicle starts on a low friction coefficient road surface (hereinafter referred to as a low-μ road) such as an icy road surface, in a case where the motor torques of the front motor 16 and the rear motor 18 are raised quickly, the front wheels 12L and 12R and the rear wheels 14L and 14R can be caused to greatly slip, resulting in an unstable vehicle behavior. To suppress slip of the front wheels 12L and 12R and the rear wheels 14L and 14R and stabilize the vehicle behavior, the control system 20 included in the vehicle control apparatus 10 may execute start torque suppression control of adjusting raising of the motor torques in accordance with the road surface situation.

Described below are the start torque suppression control and suppression condition setting control preceding the start torque suppression control.

Figure 5:
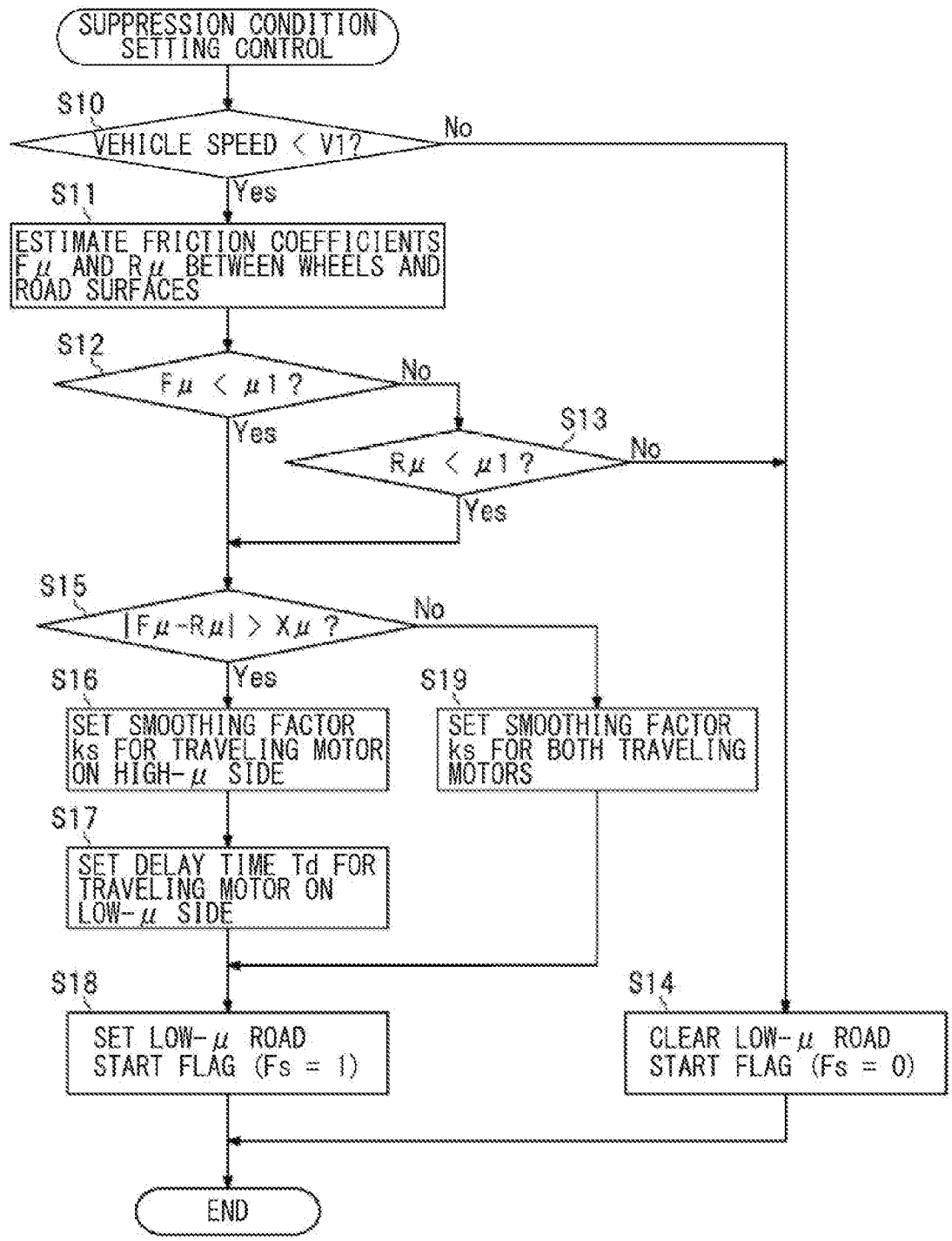
FIG. 5 is a flowchart illustrating an example of a procedure of executing suppression condition setting control.
Figure 6:
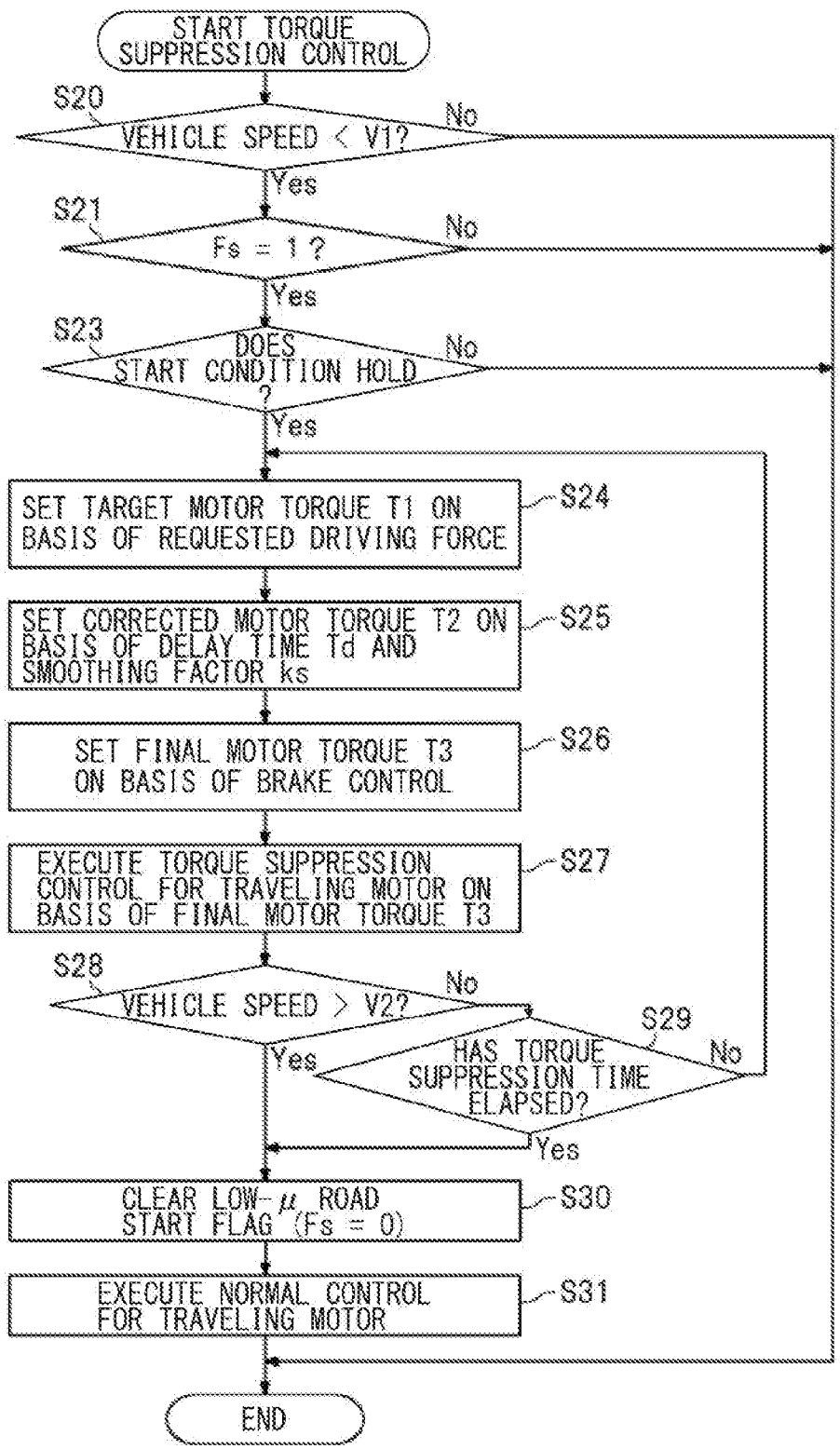
FIG. 6 is a flowchart illustrating an example of a procedure of executing start torque suppression control.

FIG. 5 is a flowchart illustrating an example of a procedure of executing the suppression condition setting control. FIG. 6 is a flowchart illustrating an example of a procedure of executing the start torque suppression control. In FIG. 5 and FIG. 6, the front motor 16 and the rear motor 18 may be referred to as traveling motors, the front wheels 12L and 12R and the rear wheels 14L and 14R may be referred to as wheels, a high friction coefficient side may be referred to as a high-μ side, and a low friction coefficient side may be referred to as a low-μ side. Note that the high friction coefficient side and the low friction coefficient side may refer to a relatively high friction coefficient side and a relatively low friction coefficient side. Each step of the flowcharts of FIG. 5 and FIG. 6 illustrates a process to be executed by the one or more processors 70 configuring the control system 20. The suppression condition setting control illustrated in FIG. 5 and the start torque suppression control illustrated in FIG. 6 may be executed by the control system 20 for each predetermined cycle, after the start switch 68 is operated by the driver and the control system 20 configured by a device such as the vehicle control unit 52 is started up.

[Suppression Condition Setting Control (Flowchart)]

Described first is the suppression condition setting control preceding the start torque suppression control. As illustrated in FIG. 5, to determine whether the vehicle 11 is stopped, it may be determined in step S10 whether the vehicle speed is less than a predetermined threshold V1. If it is determined in step S10 that the vehicle speed is less than the threshold V1, i.e., if it is determined that the vehicle 11 is stopped (step S10: Yes), the procedure may proceed to step S11, and friction coefficients Fμ and Rμ between the wheels and road surfaces may be estimated. In step S11, the image analysis of the imaging data obtained by the camera modules 43L and 43R may be executed to determine the road surface situation, and the friction coefficients Fμ and Rμ between the wheels and the road surfaces may be estimated from the determined road surface situation (e.g., a dry road surface, a wet road surface, a snowy road surface, or an icy road surface). The friction coefficient Fμ may be an average of friction coefficients between the left and right front wheels 12L and 12R and a road surface Sf (see FIG. 1) in contact with the front wheels 12L and 12R. The friction coefficient Rμ may be an average of friction coefficients between the left and right rear wheels 14L and 14R and a road surface Sr (see FIG. 1) in contact with the rear wheels 14L and 14R. In one embodiment, the friction coefficient Fμ may serve as a "first friction coefficient". In one embodiment, the friction coefficient Rμ may serve as a "second friction coefficient".

Thereafter, in step S12, it may be determined whether the friction coefficient Fμ is less than a predetermined threshold μ1. In one embodiment, the threshold μ1 may serve as a "first threshold". If it is determined in step S12 that the friction coefficient Fμ is equal to or greater than the threshold i.e., if it is determined that the front wheels 12L and 12R are in contact with a non-slippery road surface such as a dry road surface (step S12: No), the procedure may proceed to step S13. In step S13, it may be determined whether the friction coefficient Rμ is less than the threshold μ1. If it is determined in step S13 that the friction coefficient Rμ is equal to or greater than the threshold i.e., if it is determined that the rear wheels 14L and 14R are in contact with a non-slippery road surface such as a dry road surface (step S13: No), the procedure may proceed to step S14. In other words, in a case where it is determined that both of the front wheels 12L and 12R and the rear wheels 14L and 14R are in contact with a non-slippery road surface, the procedure may proceed to step S14, because it is unnecessary to execute the start torque suppression control to be described later. In step S14, a low-μ road start flag may be cleared (Fs=0).

If it is determined in step S12 that the friction coefficient Fμ is less than the threshold μ1 (step S12: Yes), or if it is determined in step S13 that the friction coefficient Rμ is less than the threshold μ1 (step S13: Yes), the procedure may proceed to step S15. In other words, in a case where it is determined that the front wheels 12L and 12R, the rear wheels 14L and 14R, or both are in contact with a slippery road surface, the procedure may proceed to step S15. In step S15, it may be determined whether the absolute value of a difference between the friction coefficient Fμ and the friction coefficient Rμ is greater than a predetermined threshold Xμ. In one embodiment, the threshold Xμ may serve as a "second threshold". If it is determined in step S15 that the absolute value of the difference between the friction coefficient Fμ and the friction coefficient Rμ is greater than the threshold Xμ. (step S15: Yes), the procedure may proceed to step S16. In step S16, a smoothing factor ks for the traveling motor on the high friction coefficient side (hereinafter referred to as the high-μ side) may be set. In subsequent step S17, a delay time Td for the traveling motor on the low friction coefficient side (hereinafter referred to as the low-μ side) may be set.

As described above, in a case where the friction coefficient Fμ, the friction coefficient Rμ, or both are less than the threshold μ1 and where the difference between the friction coefficients Fμ and Rμ is greater than the threshold Xμ, the procedure may proceed to step S16, and the smoothing factor ks for the traveling motor on the high-μ side may be set. Thereafter, the procedure may proceed to step S17, and the delay time Td for the traveling motor on the low-μ side may be set. For example, in a case where the friction coefficient Fμ is smaller than the friction coefficient Rμ, indicating that the front wheels 12L and 12R are likely to slip, the smoothing factor ks for the rear motor 18 on the high-μ side may be set, and the delay time Td for the front motor 16 on the low-μ side may be set. In a case where the friction coefficient Rμ is smaller than the friction coefficient Fμ, indicating that the rear wheels 14L and 14R are likely to slip, the smoothing factor ks for the front motor 16 on the high-μ side may be set, and the delay time Td for the rear motor 18 on the low-μ side may be set. After the smoothing factor ks and the delay time Td are thus set in steps S16 and S17, the procedure may proceed to step S18, and a low-μ road start flag Fs may be set (Fs=1).

If it is determined in step S15 that the absolute value of the difference between the friction coefficient Fμ and the friction coefficient Rμ is equal to or less than the threshold Xμ (step S15: No), the procedure may proceed to step S19. In step S19, the smoothing factor ks for both the traveling motors may be set. In other words, the smoothing factor ks for the front motor 16 may be set, and the smoothing factor ks for the rear motor 18 may be set. After the smoothing factor ks is thus set in step S19, the procedure may proceed to step S18, and the low-μ road start flag Fs may be set (Fs=1).

Figure 7:
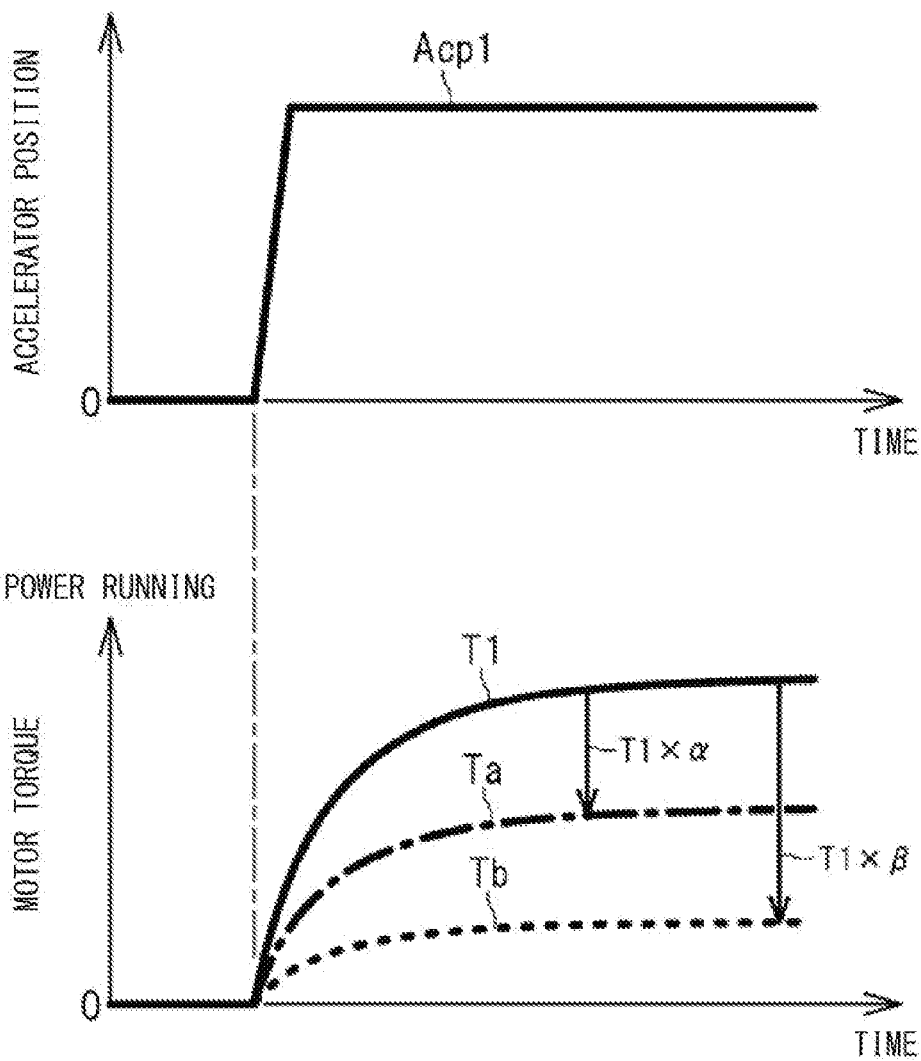
FIG. 7 is a diagram illustrating an example of a smoothing factor and a motor torque control example.

FIG. 7 is a diagram illustrating an example of the smoothing factor ks and a motor torque control example. As illustrated in FIG. 7, the smoothing factor ks may be set smaller as the friction coefficient becomes smaller. The motor torque that is outputted from the traveling motor, such as the front motor 16 or the rear motor 18, may be controlled to become smaller as the smoothing factor ks is set smaller. For example, in a case where the accelerator pedal is operated along a solid line Acp1 and the target motor torque T1 described above is set as the target motor torque, the motor torque of the traveling motor may be controlled toward the target motor torque T1. In this situation, in a case where "α" has been set as the smoothing factor ks, a motor torque Ta may be set by multiplying the target motor torque T1 by the smoothing factor α, and the traveling motor may be controlled toward the motor torque Ta subjected to a smoothing process. In a case where "β" has been set as the smoothing factor ks, a motor torque Tb may be set by multiplying the target motor torque T1 by the smoothing factor β, and the traveling motor may be controlled toward the motor torque Tb subjected to the smoothing process.

Thus performing the smoothing process on the motor torque of the traveling motor enables the power running torque of the traveling motor to be controlled to be smaller than the target motor torque T1 based on the requested driving force. In one embodiment, the target motor torque T1 may serve as a "target torque". As described above, the smoothing factor ks may be set smaller as the friction coefficient becomes smaller. This enables the power running torque of the traveling motor to be controlled to become smaller as the friction coefficient becomes smaller. Note that how to control the power running torque of the traveling motor to a smaller value than the target motor torque T1 is not limited to the control method using the smoothing factor. For example, an upper limit torque of the traveling motor may be set on the basis of the friction coefficient, or a torque increase rate of the traveling motor may be limited on the basis of the friction coefficient.

Figure 8:
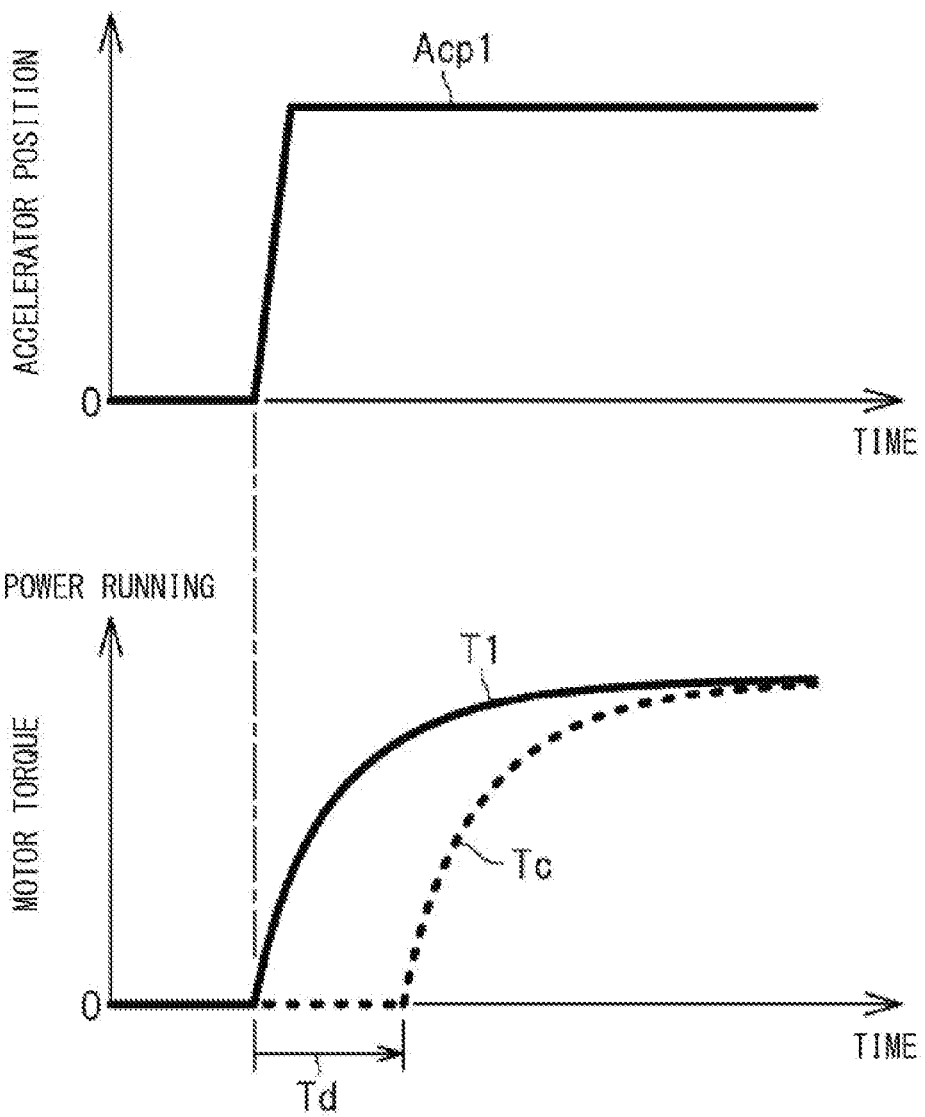
FIG. 8 is a diagram illustrating an example of a delay time and a motor torque control example.

FIG. 8 is a diagram illustrating an example of the delay time Td and a motor torque control example. As illustrated in FIG. 8, the delay time Td may be set longer as the friction coefficient becomes smaller. Increasing of the motor torque that is outputted from the traveling motor, such as the front motor 16 or the rear motor 18, may be started after the delay time Td elapses from the depression of the accelerator pedal. For example, in a case where the accelerator pedal is operated along the solid line Acp1 and the target motor torque T1 described above is set as the target motor torque, the motor torque of the traveling motor may be controlled toward the target motor torque T1. In this situation, in a case where the delay time Td has been set, the motor torque may be kept at "0" until the delay time Td elapses from the start of the operation on the accelerator pedal, and the motor torque may be raised after the elapse of the delay time Td, as indicated by a dashed line Tc. [Start Torque Suppression Control (Flowchart)] Described next is the start torque suppression control. As illustrated in FIG. 6, to determine whether the vehicle 11 is stopped, it may be determined in step S20 whether the vehicle speed is less than the predetermined threshold V1. If it is determined in step S20 that the vehicle speed is less than the threshold V1, i.e., if it is determined that the vehicle 11 is stopped (step S20: Yes), the procedure may proceed to step S21, and it may be determined whether the low-μ road start flag Fs is set at "1". If it is determined in step S21 that the low-μ road start flag Fs is set at "1" (step S21: Yes), the procedure may proceed to step S23, and whether a condition for a start of the vehicle 11 holds may be determined. Non-limiting examples of the condition for the start of the vehicle 11 may include depression of the accelerator pedal and release of the brake pedal 46.

If it is determined in step S23 that the condition for the start of the vehicle 11 holds (step S23: Yes), the procedure may proceed to step S24, and the target motor torque T1 may be set on the basis of the requested driving force described above. The target motor torque T1 may be the target motor torque that is set for the front motor 16 and the rear motor 18 to allow the requested driving force set on the basis of the driving force map of FIG. 4 to be obtained. After the target motor torque T1 is set for each traveling motor, the procedure may proceed to step S25, and a corrected motor torque T2 may be set on the basis of the delay time Td and the smoothing factor ks described above. The corrected motor torque T2 may be the motor torque that is suppressed and outputted on the basis of the smoothing factor ks, as illustrated in FIG. 7. The corrected motor torque T2 may be the motor torque that is delayed and outputted on the basis of the delay time Td, as illustrated in FIG. 8. After the corrected motor torque T2 is set for each traveling motor, the procedure may proceed to step S26, and a final motor torque T3 may be set on the basis of brake control. The final motor torque T3 may be the motor torque that is corrected so as not to influence braking force control for suppression of, for example, wheel slip when the brake device 45 described above executes the braking force control.

After the final motor torque T3 is thus set for each traveling motor, the procedure may proceed to step S27. In step S27, the front motor 16 may be controlled on the basis of the final motor torque T3 for the front motor, and the rear motor 18 may be controlled on the basis of the final motor torque T3 for the rear motor. In other words, in causing the vehicle 11 to start on a low-μ road, such as an icy road surface, the delay time Td and the smoothing factor ks may be set on the basis of the friction coefficients Fμ and Rμ, and the motor torques of the front motor 16 and the rear motor 18 may be suppressed by the delay time Td and the smoothing factor ks. This makes it possible to suppress excessive slip of the front wheels 12L and 12R and the rear wheels 14L and 14R, making it possible to stabilize the behavior of the vehicle 11 that starts on the low-μ road.

Thereafter, in step S28, it may be determined whether the vehicle speed after the start is greater than a predetermined threshold V2. If it is determined in step S28 that the vehicle speed is equal to or less than the threshold V2 (step S28: No), the procedure may proceed to step S29, and it may be determined whether elapsed time after the start is greater than a predetermined torque suppression time. If it is determined in step S29 that the elapsed time after the start is equal to or less than the torque suppression time (step S29: No), the procedure may return to step S24, and the torque suppression control for each traveling motor may be continued. In other words, in a case where the vehicle speed after the start is equal to or less than the threshold V2 and where the elapsed time after the start is equal to or less than the torque suppression time, the procedure may return to step S24, and the torque suppression control for each traveling motor may be continued.

If it is determined in step S28 that the vehicle speed after the start is greater than the threshold V2 (step S28: Yes), or if it is determined in step S29 that the elapsed time after the start is greater than the torque suppression time (step S29: Yes), the procedure may proceed to step S30, and the low-μ road start flag may be cleared (Fs=0). Thereafter, the procedure may proceed to step S31, and normal control for the traveling motor may be executed. The normal control for the traveling motor may refer to control of setting the target motor torque on the basis of the accelerator position and the vehicle speed, without using the delay time Td and the smoothing factor ks described above.

[Start Torque Suppression Control (Timing Chart 1)]

Figure 9:
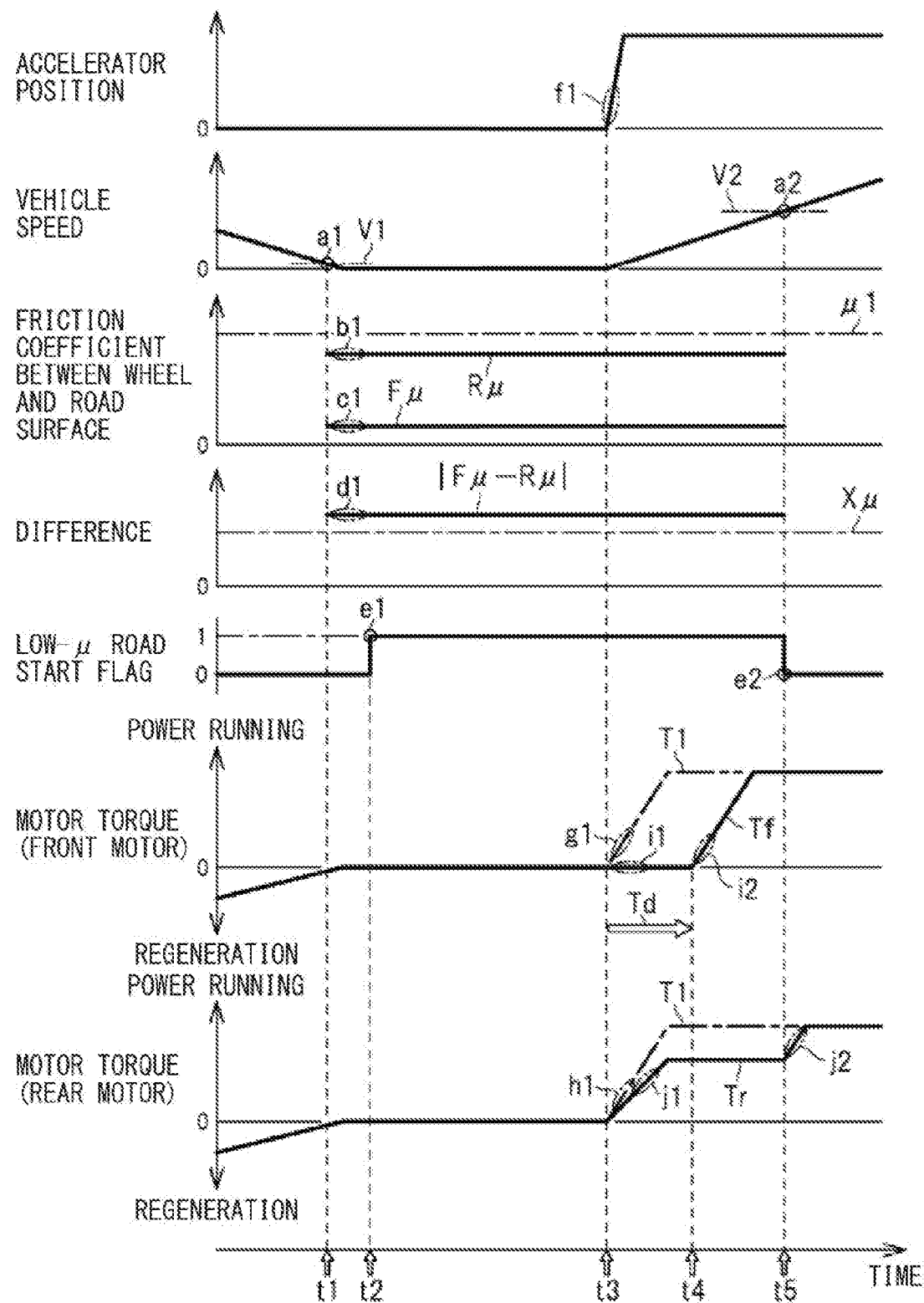
FIG. 9 is a timing chart illustrating an example of a situation in which the start torque suppression control is executed.

A situation in which the start torque suppression control described above is executed is described along a timing chart. FIG. 9 is a timing chart illustrating an example of the situation in which the start torque suppression control is executed. FIG. 10 is a diagram illustrating the vehicle 11 that is caused to start by the start torque suppression control. Note that times t3 and t4 illustrated in FIG. 10 may respectively correspond to times t3 and t4 illustrated in FIG. 9. FIG. 9 and FIG. 10 illustrate a situation in which the accelerator pedal is depressed to cause the vehicle 11 to start from a stopped state in which, for example, the front wheels 12L and 12R are stopped on an icy road surface and the rear wheels 14L and 14R are stopped on a snowy road surface.

At a time t1 in FIG. 9, in a case where the vehicle speed falls below the threshold V1 toward a stop, as indicated by a reference sign a1, the friction coefficient Fμ between the front wheels 12L and 12R and the road surface in contact with the front wheels 12L and 12R may be estimated, and the friction coefficient Rμ between the rear wheels 14L and 14R and the road surface in contact with the rear wheels 14L and 14R may be estimated. A situation in which the friction coefficients Fμ and Rμ are less than the threshold μ1 and the difference (|Fμ−R$_μ$|) between the friction coefficients Fμ and Rμ is greater than the threshold Xμ may continue for a predetermined period of time, as indicated by reference signs b1, c1, and d1. In this case, at a time t2, the delay time Td and the smoothing factor ks described above may be set, and the low-μ road start flag Fs may be set, as indicated by a reference sign e1. The low-μ road start flag Fs may serve as a condition for execution of the torque suppression control. In the illustrated example, the delay time Td for the front motor 16 on the low-μ side may be set and the smoothing factor ks for the rear motor 18 on the high-μ side may be set, because the friction coefficient Fμ is smaller than the friction coefficient Rμ.

At the time t3, in a case where the accelerator pedal is depressed by the driver, as indicated by a reference sign f1, the target motor torque T1 of the front motor 16 and the rear motor 18 may increase in accordance with the accelerator position, as indicated by reference signs g1 and h1. Because the delay time Td has been set for the front motor 16, a motor torque Tf of the front motor 16 may be controlled to be "0" for the delay time Td, without following the target motor torque T1, as indicated by a reference sign j1.

Because the smoothing factor ks has been set for the rear motor 18 on the basis of the friction coefficient Rμ, a motor torque Tr of the rear motor 18 may be subjected to the smoothing process to be controlled more gently than the target motor torque T1 to be smaller than the target motor torque T1, as indicated by a reference sign j1.

At the time t4, in a case where the delay time Td elapses from the depression of the accelerator pedal, the motor torque Tf of the front motor 16 may be controlled toward the target motor torque T1, as indicated by a reference sign i2. Thereafter, at a time t5, in a case where the vehicle speed reaches the predetermined threshold V2, as indicated by a reference sign a2, the low-μ road start flag may be cleared to terminate the torque suppression control using the delay time Td and the smoothing factor ks, as indicated by a reference sign e2. The motor torque Tr of the rear motor 18 may be controlled toward the target motor torque T1, as indicated by a reference sign j2.

As described above, when the vehicle starts in a situation in which the friction coefficient Fμ, the friction coefficient Rμ, or both are less than the threshold μ1 and the difference (|Fμ−Rμ|) between the friction coefficients Fμ and Rμ is greater than the threshold Xμ, the power running torque of the front motor 16 may be increased after the delay time Td based on the friction coefficient Fμ elapses after the power running torque of the rear motor 18 is increased, in a case where the friction coefficient Fμ is smaller than the friction coefficient Rμ. In one embodiment, the delay time Td may serve as a "first delay time". In one embodiment, the friction coefficient Fμ may serve as the "first friction coefficient". In other words, the increasing of the power running torque of the front motor 16 may be started after the elapse of the delay time Td after the increasing of the power running torque of the rear motor 18 is started. As represented by a state at the time t3 in FIG. 10, in a case where the friction coefficient Fμ is smaller than the friction coefficient Rμ, i.e., in a case where the front wheels 12L and 12R are stopped on a more slippery road surface than the rear wheels 14L and 14R, the power running torque of the rear motor 18 may be increased prior to the front motor 16.

Thus, a driving force Fr may be given to the rear wheels 14L and 14R in contact with the snowy road surface less slippery than the icy road surface, whereas a driving force for the front wheels 12L and 12R in contact with the icy road surface more slippery than the snowy road surface may be controlled to be zero. This makes it possible to cause the front wheels 12L and 12R on the low-μ side to rotate in conjunction with the vehicle speed to prevent them from slipping, while causing the vehicle 11 to start by giving the driving force Fr to the rear wheels 14L and 14R on the high-μ side. In a case where the vehicle 11 is thus caused to start, after the front wheels 12L and 12R rotate for the delay time Td, a driving force Ff may be given to the rotating front wheels 12L and 12R by increasing the power running torque of the front motor 16, as represented by a state at the time t4 in FIG. 10. This makes it possible to suppress slip of the front wheels 12L and 12R in contact with, for example, the icy road surface, making it possible to stabilize the vehicle behavior at the start.

As described above, when the vehicle starts in a situation in which the front wheels 12L and 12R and the rear wheels 14L and 14R are in contact with a low-μ road, such as an icy road surface, in a case where the difference between the front and rear friction coefficients Fμ and Rμ is large, the driving force Fr may be given to the rear wheels 14L and 14R on the high-μ side, whereas the driving force for the front wheels 12L and 12R on the low-μ side may be controlled to be zero for the delay time Td. After the front wheels 12L and 12R rotate for the delay time Td, the driving force Ff may be given to the rotating front wheels 12L and 12R by increasing the power running torque of the front motor 16. Thus causing the front wheels 12L and 12R to rotate for the delay time Td makes it possible to suppress slip of the front wheels 12L and 12R. The delay time Td may be calculated on the basis of, for example, the friction coefficient.

First, an amount of slip allowable for the wheel that is driven by the traveling motor may be set as a target amount of slip SL [km/h]. The target amount of slip SL may be converted into a torque overshoot Tos [Nm] of the traveling motor by using, for example, a gear ratio of a drivetrain. The torque overshoot Tos may be a motor torque Tma [Nm] allowable for the traveling motor, in terms of limiting the amount of slip of the wheel to the target amount of slip SL or less. For example, as represented by Expression (1) given below, kinetic friction force Ffri [Nm] that acts on the wheel may be subtracted from the torque overshoot Tos, and the motor torque Tma of the traveling motor may be controlled so as not to exceed a value obtained by the subtraction. This makes it possible to limit the amount of slip of the wheel to the target amount of slip SL or less. Note that the kinetic friction force Ffri may be calculated by using the friction coefficient between the corresponding wheel and the road surface. After the motor torque Tma of the traveling motor to be limited is obtained as described above, the delay time Td [msec] may be calculated by dividing the motor torque Tma by a torque increase rate Rm [Nm/msec] of the traveling motor, as represented by Expression (2) given below. Zero torque control may be executed for the delay time Td thus calculated, which makes it possible to increase the rotation speed of the corresponding wheel to prevent the target amount of slip SL from being exceeded.

$$Tma\ [Nm] < Tos\ [Nm] - Ffri\ [Nm] \quad \text{Expression (1)}$$

$$Td\ [msec] = Tma\ [Nm] / Rm\ [Nm/msec] \quad \text{Expression (2)}$$

Although FIG. 9 and FIG. 10 illustrate, as an example, the case where the friction coefficient Fμ is smaller than the friction coefficient Rμ, this is a non-limiting example. In the example illustrated in FIG. 9 and FIG. 10, in a case where the friction coefficient Rμ is smaller than the friction coefficient Fμ, i.e., in a case where the rear wheels 14L and 14R are stopped on a more slippery road surface than the front wheels 12L and 12R, the delay time Td based on the friction coefficient Rμ may be set for the rear motor 18 on the low-μ side. In one embodiment, the delay time Td may serve as a "second delay time". In one embodiment, the friction coefficient Rμ may serve as the "second friction coefficient". When the vehicle starts, the power running torque of the rear motor 18 may be increased after the delay time Td based on the friction coefficient Rμ elapses after the power running torque of the front motor 16 is increased. In other words, the increasing of the power running torque of the rear motor 18 may be started after the elapse of the delay time Td after the increasing of the power running torque of the front motor 16 is started. Although the smoothing process may be performed on the traveling motor on the high-μ side in the above description, this is a non-limiting example. The vehicle 11 may be caused to start without the smoothing process being performed on the traveling motor on the high-μ side.

[Start Torque Suppression Control (Timing Chart 2)]

Figure 11:
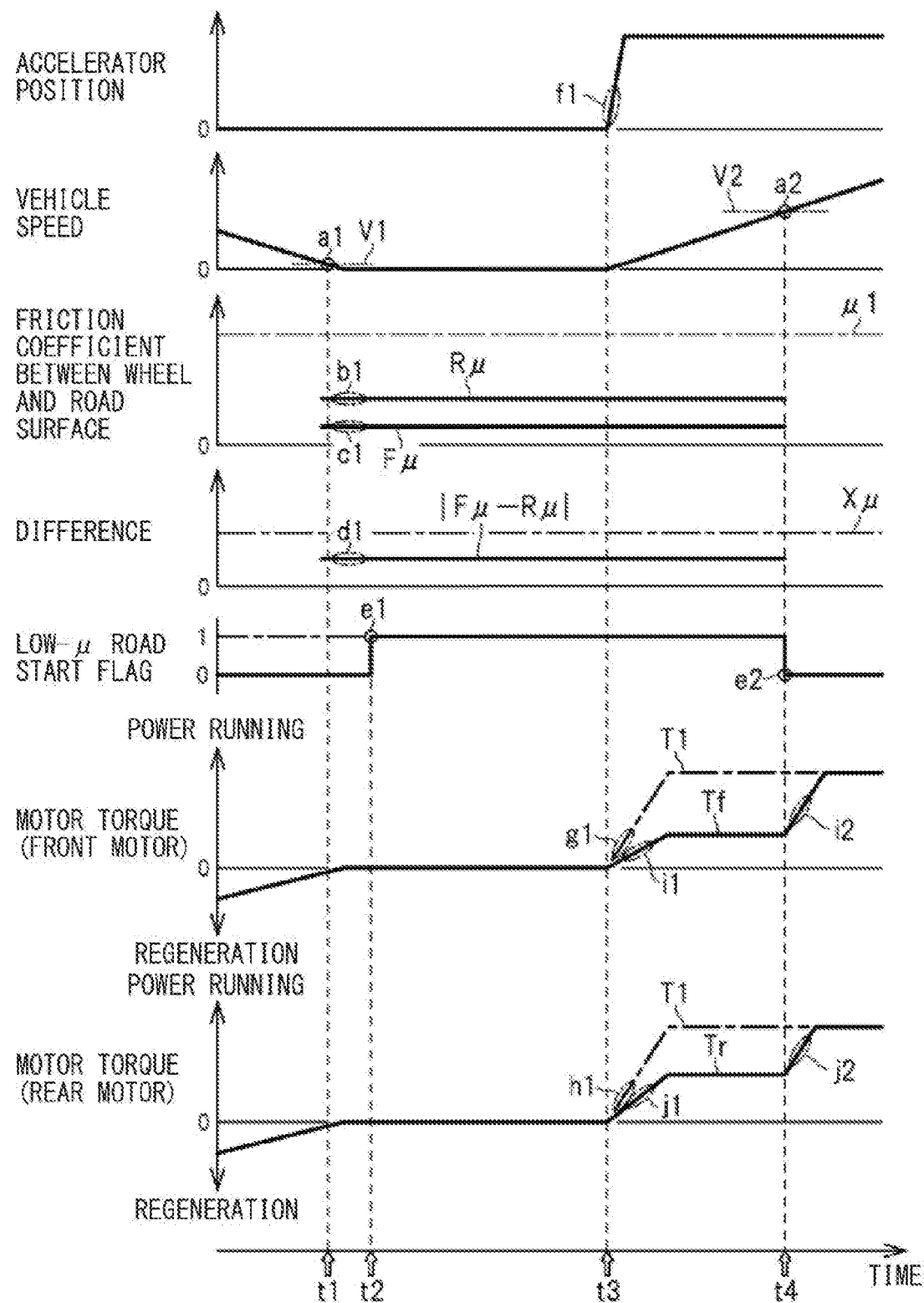
FIG. 11 is a timing chart illustrating an example of a situation in which the start torque suppression control is executed.

The timing chart of FIG. 9 described above illustrates the situation in which the difference (|Fμ–Rμ|) between the friction coefficients Fμ and Rμ is greater than the threshold Xμ. The following description describes a situation in which the friction coefficients Fμ and Rμ are less than the threshold μ1 and the difference (|Fμ–Rμ|) between the friction coefficients Fμ and Rμ is less than the threshold Xμ. FIG. 11 is a timing chart illustrating an example of a situation in which the start torque suppression control is executed.

At a time t1 in FIG. 11, in a case where the vehicle speed falls below the threshold V1 toward a stop, as indicated by a reference sign a1, the friction coefficient Fμ between the front wheels 12L and 12R and the road surface in contact with the front wheels 12L and 12R may be estimated, and the friction coefficient Rμ between the rear wheels 14L and 14R and the road surface in contact with the rear wheels 14L and 14R may be estimated. A situation in which the friction coefficients Fμ and Rμ are less than the threshold μ1 and the difference (|Fμ–Rμ|) between the friction coefficients Fμ and Rμ is less than the threshold Xμ may continue for a predetermined period of time, as indicated by reference signs b1, c1, and d1. In this case, at a time t2, the smoothing factor ks may be set for both the traveling motors, and the low-μ road start flag Fs may be set, as indicated by a reference sign e1. The low-μ road start flag Fs may serve as a condition for execution of the torque suppression control. In other words, the smoothing factor ks for the front motor 16 may be set, and the smoothing factor ks for the rear motor 18 may be set.

At the time t3, in a case where the accelerator pedal is depressed by the driver, as indicated by a reference sign f1, the target motor torque T1 of the front motor 16 and the rear motor 18 may increase in accordance with the accelerator position, as indicated by reference signs g1 and h1. Because the smoothing factor ks has been set for the front motor 16 on the basis of the friction coefficient Fμ, the motor torque Tf of the front motor 16 may be subjected to the smoothing process to be controlled more gently than the target motor torque T1 to be smaller than the target motor torque T1, as indicated by a reference sign i1. Similarly, because the smoothing factor ks has been set for the rear motor 18 on the basis of the friction coefficient Rμ, the motor torque Tr of the rear motor 18 may be subjected to the smoothing process to be controlled more gently than the target motor torque T1 to be smaller than the target motor torque T1, as indicated by a reference sign j1.

Thereafter, at a time t4, in a case where the vehicle speed reaches the predetermined threshold V2, as indicated by a reference sign a2, the low-μ road start flag may be cleared to terminate the torque suppression control using the smoothing factor ks, as indicated by a reference sign e2. The motor torque Tf of the front motor 16 may be controlled toward the target motor torque T1, as indicated by a reference sign i2, and the motor torque Tr of the rear motor 18 may be controlled toward the target motor torque T1, as indicated by a reference sign j2.

As described above, when the vehicle starts in a situation in which the friction coefficient Fμ, the friction coefficient Rμ, or both are less than the threshold μ1 and the difference (|Fμ−Rμ|) between the friction coefficients Fμ and Rμ is equal to or less than the threshold Xμ, the smoothing process may be performed on both of the motor torques Tf and Tr, because the friction coefficient Fμ and the friction coefficient Rμ are close to each other. This makes it possible to give appropriate driving forces to the front wheels 12L and 12R and the rear wheels 14L and 14R, which helps to enhance start performance of the vehicle 11. Moreover, the motor torque Tf of the front motor 16 may be controlled by using the smoothing factor ks based on the friction coefficient Fμ, and the motor torque Tr of the rear motor 18 may be controlled by using the smoothing factor ks based on the friction coefficient Rμ. This makes it possible to appropriately control the motor torques Tf and Tr in accordance with the road surface situation, which helps to enhance the start performance of the vehicle 11 and stabilize the vehicle behavior.

Another Example Embodiment

[Configuration of Vehicle]

Figure 12:
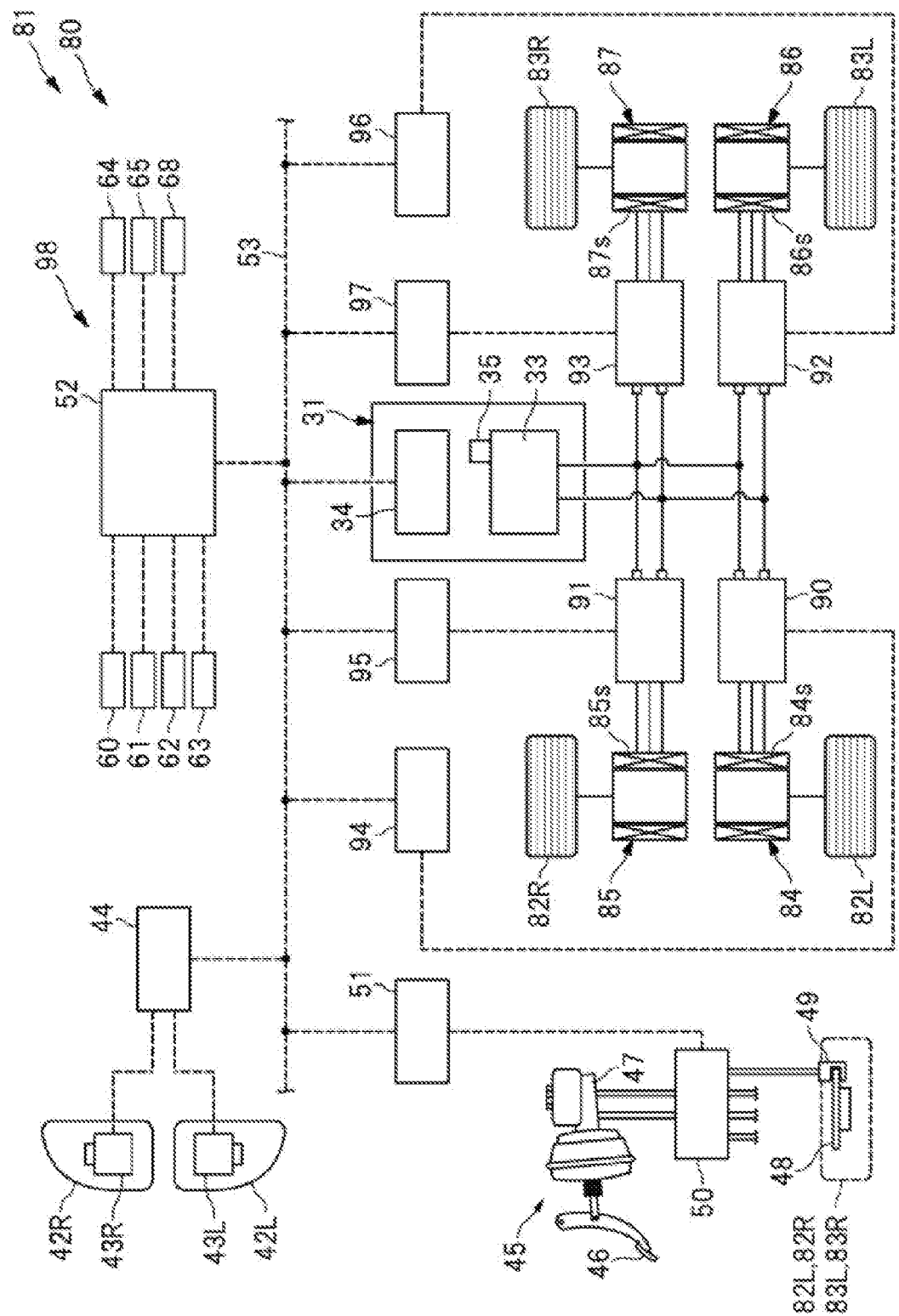
FIG. 12 is a diagram illustrating an example of a configuration of a vehicle provided with a vehicle control apparatus according to one example embodiment of the technology.

In the above description, one front motor 16 may be coupled to the left and right front wheels 12L and 12R, and one rear motor 18 may be coupled to the left and right rear wheels 14L and 14R. However, this is a non-limiting example. One traveling motor may be coupled for each of the wheels 12L, 12R, 14L, and 14R. FIG. 12 is a diagram illustrating an example of a configuration of a vehicle 81 provided with a vehicle control apparatus 80 according to another example embodiment of the technology. In FIG. 12, elements similar to the elements illustrated in FIG. 2 are denoted with the same reference signs, and descriptions thereof are omitted.

As illustrated in FIG. 12, the vehicle 81 may include a left front motor 84 coupled to a left front wheel 82L, a right front motor 85 coupled to a right front wheel 82R, a left rear motor 86 coupled to a left rear wheel 83L, and a right rear motor 87 coupled to a right rear wheel 83R. The left front motor 84 may have a stator 84s coupled to an inverter 90. The right front motor 85 may have a stator 85s coupled to an inverter 91. The left rear motor 86 may have a stator 86s coupled to an inverter 92. The right rear motor 87 may have a stator 87s coupled to an inverter 93. The inverters 90 to 93 may be coupled to the battery pack 31.

A left front motor control unit 94 may be coupled to the inverter 90 to control the left front motor 84 via the inverter 90. A right front motor control unit 95 may be coupled to the inverter 91 to control the right front motor 85 via the inverter 91. A left rear motor control unit 96 may be coupled to the inverter 92 to control the left rear motor 86 via the inverter 92. A right rear motor control unit 97 may be coupled to the inverter 93 to control the right rear motor 87 via the inverter 93. The motor control units 94 to 97 and the battery control unit 34, the camera control unit 44, the brake control unit 51, and the vehicle control unit 52 described above may configure a control system 98.

[Suppression Condition Setting Control (Flowchart)]

Figure 13:
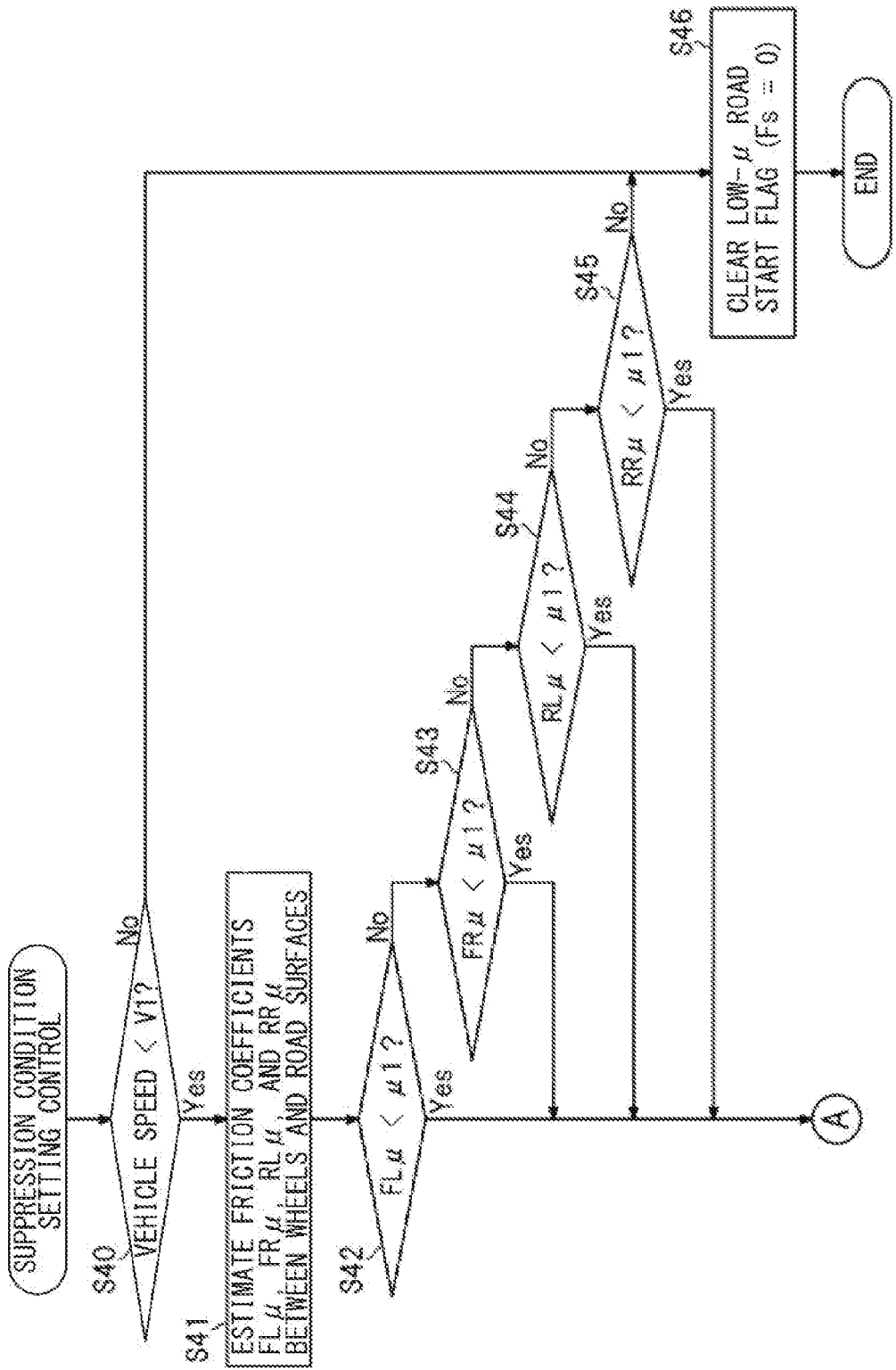
FIG. 13 is a flowchart illustrating an example of a procedure of executing the suppression condition setting control.
Figure 14:
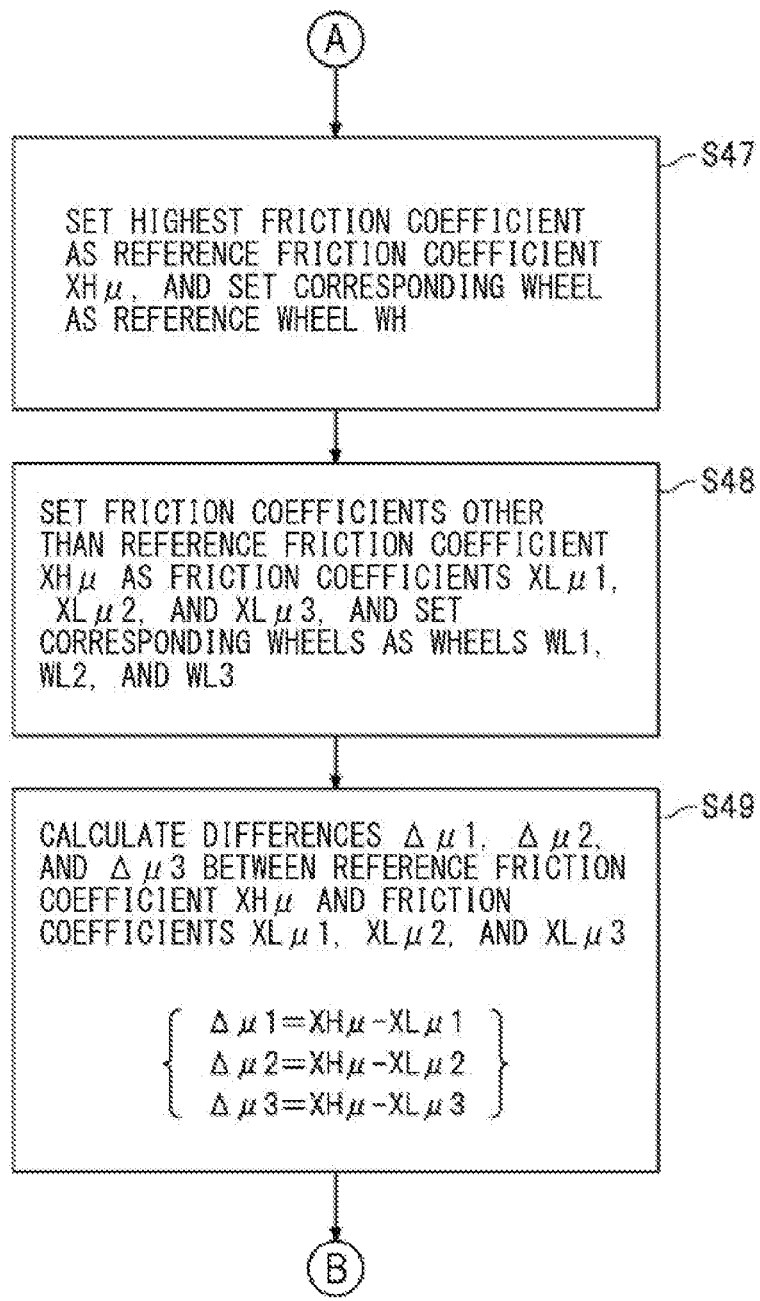
FIG. 14 is a flowchart illustrating the example of the procedure of executing the suppression condition setting control.
Figure 15:
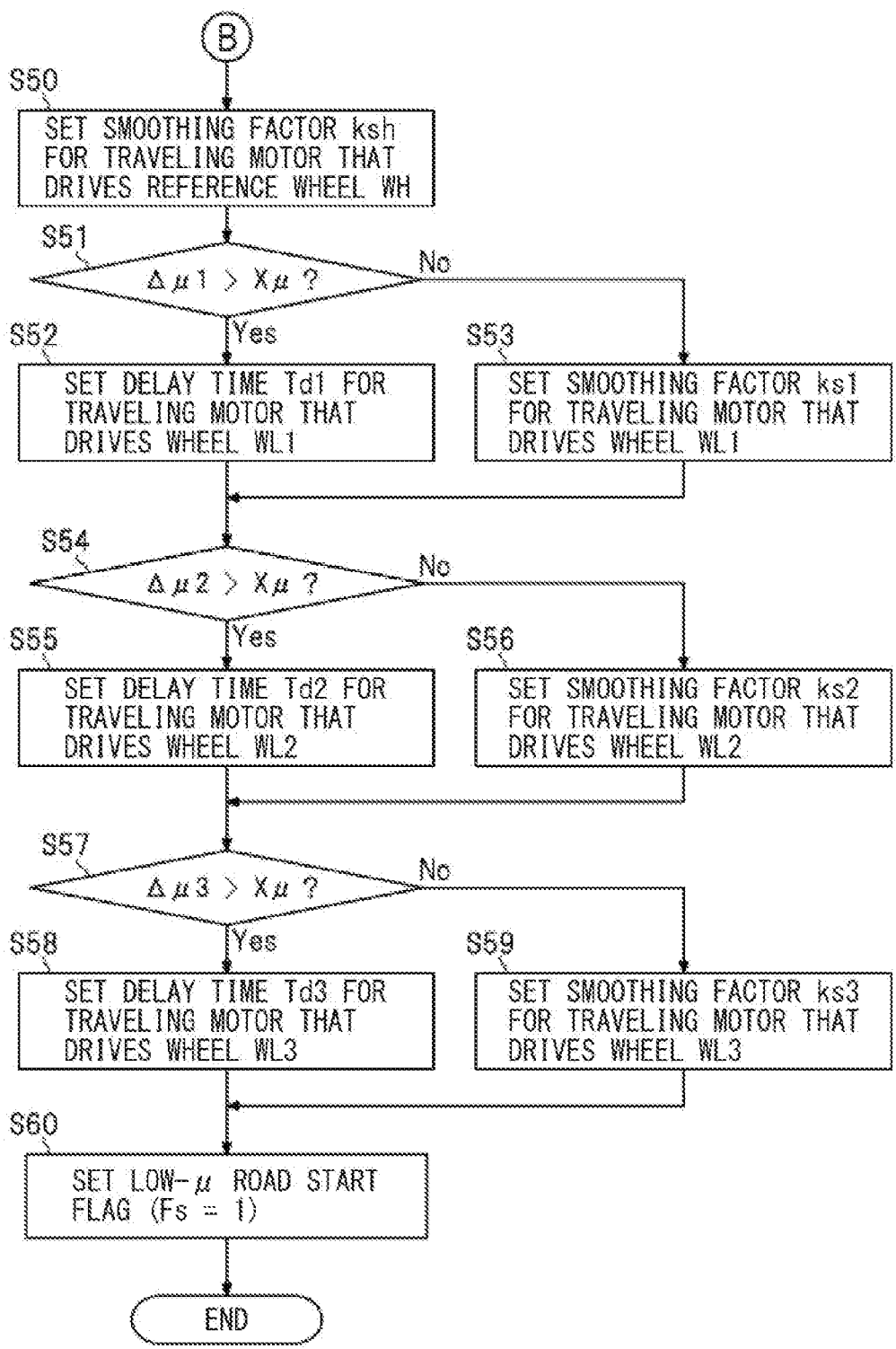
FIG. 15 is a flowchart illustrating the example of the procedure of executing the suppression condition setting control.

Described next is the suppression condition setting control that is executed by the control system 98 included in the vehicle control apparatus 80. FIG. 13 to FIG. 15 are flowcharts illustrating an example of a procedure of executing the suppression condition setting control. The flowcharts of FIG. 13 to FIG. 15 may be coupled to each other at points denoted with reference signs A and B. In FIG. 14 and FIG. 15, the left and right front motors 84 and 85 and the left and right rear motors 86 and 87 may be referred to as traveling motors, and the left front wheel 82L, the right front wheel 82R, the left rear wheel 83L, and the right rear wheel 83R may be referred to as wheels. Note that, also in the vehicle control apparatus 80, the start torque suppression control may be executed along the procedure illustrated in the flowchart of FIG. 6 described above.

As illustrated in FIG. 13, to determine whether the vehicle 81 is stopped, it may be determined in step S40 whether the vehicle speed is less than the predetermined threshold V1. If it is determined in step S40 that the vehicle speed is less than the threshold V1, i.e., if it is determined that the vehicle 81 is stopped (step S40: Yes), the procedure may proceed to step S41, and friction coefficients FLμ, FRμ, RLμ, and RRμ between the wheels and road surfaces may be estimated. In step S41, the image analysis of the imaging data obtained by the camera modules 43L and 43R may be executed to determine the road surface situation, and the friction coefficients FLμ, FRμ, RLμ, and RRμ between the wheels and the road surfaces may be estimated from the determined road surface situation (e.g., a dry road surface, a wet road surface, a snowy road surface, or an icy road surface).

The friction coefficient FLμ may be the friction coefficient between the left front wheel 82L and the road surface in contact with the left front wheel 82L. The friction coefficient FRμ may be the friction coefficient between the right front wheel 82R and the road surface in contact with the right front wheel 82R. The friction coefficient RLμ may be the friction coefficient between the left rear wheel 83L and the road surface in contact with the left rear wheel 83L. The friction coefficient RRμ may be the friction coefficient between the right rear wheel 83R and the road surface in contact with the right rear wheel 83R.

Thereafter, in step S42, it may be determined whether the friction coefficient FLμ is less than the predetermined threshold μ1. In one embodiment, the threshold μ1 may serve as the "first threshold". If it is determined in step S42 that the friction coefficient FLμ is equal to or greater than the threshold μ1, i.e., if it is determined that the left front wheel 82L is in contact with a non-slippery road surface such as a dry road surface (step S42: No), the procedure may proceed to step S43. In step S43, it may be determined whether the friction coefficient FRμ is less than the threshold μ1. If it is determined in step S43 that the friction coefficient FRμ is equal to or greater than the threshold μ1, i.e., if it is determined that the right front wheel 82R is in contact with a non-slippery road surface (step S43: No), the procedure may proceed to step S44.

In step S44, it may be determined whether the friction coefficient RLμ is less than the threshold μ1. If it is determined in step S44 that the friction coefficient RLμ is equal to or greater than the threshold i.e., if it is determined that the left rear wheel 83L is in contact with a non-slippery road surface (step S44: No), the procedure may proceed to step S45. In step S45, it may be determined whether the friction coefficient RRμ is less than the threshold μ1. If it is determined in step S45 that the friction coefficient RRμ is equal to or greater than the threshold i.e., if it is determined that the right rear wheel 83R is in contact with a non-slippery road surface (step S45: No), the procedure may proceed to step S46. In other words, in a case where it is determined that all of the left front wheel 82L, the right front wheel 82R, the left rear wheel 83L, and the right rear wheel 83R are in contact with a non-slippery road surface, the procedure may proceed to step S46, because it is unnecessary to execute the start torque suppression control. In step S46, the low-μ road start flag may be cleared (Fs=0).

If it is determined in step S42 to S45 that any of the friction coefficients FLμ, FRμ, RLμ, and RRμ is less than the threshold μ1 (steps S42 to S45: Yes), the procedure may proceed to step S47. As illustrated in FIG. 14, in step S47, the highest friction coefficient of the friction coefficients FLμ, FRμ, RLμ, and RRμ, may be set as a reference friction coefficient XHμ. Of the wheels, the wheel corresponding to the reference friction coefficient XHμ may be set as a reference wheel WH. In subsequent step S48, of the friction coefficients FLμ, FRμ, RLμ, and RRμ, the friction coefficients other than the reference friction coefficient XHμ may be set as friction coefficients XLμ1, XLμ2, and XLμ3. Of the wheels, the wheels corresponding to the friction coefficients XLμ1, XLμ2, and XLμ3 may be set as wheels WL1, WL2, and WL3. Thereafter, in step S49, differences Δμ1, Δμ2, and Δμ3 between the reference friction coefficient XHμ and the friction coefficients XLμ1, XLμ2, and XLμ3 may be calculated, as represented by Expressions (3) to (5) given below.

$$\Delta\mu 1 = XH\mu - XL\mu 1 \quad \text{Expression (3)}$$

$$\Delta\mu 2 = XH\mu - XL\mu 2 \quad \text{Expression (4)}$$

$$\Delta\mu 3 = XH\mu - XL\mu 3 \quad \text{Expression (5)}$$

Thereafter, as illustrated in FIG. 15, the procedure may proceed to step S50, and a smoothing factor ksh for the traveling motor that drives the reference wheel WH may be set. In subsequent step S51, it may be determined whether the difference Δμ1 between the friction coefficients XHμ and XLμ1 is greater than the predetermined threshold Xμ. In one embodiment, the threshold Xμ may serve as the "second threshold". If it is determined in step S51 that the difference Δμ1 is greater than the threshold Xμ (step S51: Yes), the procedure may proceed to step S52, and a delay time Td1 for the traveling motor that drives the wheel WL1 may be set. If it is determined in step S51 that the difference Δμ1 is equal to or less than the threshold Xμ (step S51: No), the procedure may proceed to step S53, and a smoothing factor ks1 for the traveling motor that drives the wheel WL1 may be set.

In subsequent step S54, it may be determined whether the difference Δμ2 between the friction coefficients XHμ and XLμ2 is greater than the threshold Xμ. If it is determined in step S54 that the difference Δμ2 is greater than the threshold Xμ (step S54: Yes), the procedure may proceed to step S55, and a delay time Td2 for the traveling motor that drives the wheel WL2 may be set. If it is determined in step S54 that the difference Δμ2 is equal to or less than the threshold Xμ (step S54: No), the procedure may proceed to step S56, and a smoothing factor ks2 for the traveling motor that drives wheel WL2 may be set.

In subsequent step S57, it may be determined whether the difference Δμ3 between the friction coefficients XHμ and XLμ3 is greater than the threshold Xμ. If it is determined in step S57 that the difference Δμ3 is greater than the threshold Xμ (step S57: Yes), the procedure may proceed to step S58, and a delay time Td3 for the traveling motor that drives the wheel WL3 may be set. If it is determined in step S57 that the difference 43 is equal to or less than the threshold Xμ (step S57: No), the procedure may proceed to step S59, and a smoothing factor ks3 for the traveling motor that drives the wheel WL3 may be set.

After the delay times Td1 to Td3 and the smoothing factors ksh and ks1 to ks3 are thus set through steps S50 to S59, the procedure may proceed to step S60, and the low-μ road start flag Fs may be set (Fs=1). The delay times Td1 to Td3 may be set along the setting procedure illustrated in, for example, FIG. 8 described above. The smoothing factors ksh and ks1 to ks3 may be set along the setting procedure illustrated in, for example, FIG. 7 described above.

As described above, the delay times Td1 to Td3 and the smoothing factors ksh and ks1 to ks3 for the traveling motors that drive the wheels may be set on the basis of the friction coefficients FLμ, FRμ, RLμ, and RRμ that are estimated when the vehicle is stopped. Thus, as with the vehicle control apparatus 10 described above, it is possible to suppress slip of the wheel in contact with, for example, an icy road surface, making it possible to stabilize the vehicle behavior at the start. Moreover, in the example embodiment, one traveling motor may be coupled for each wheel, which makes it possible to more appropriately control the driving force for each wheel in accordance with the road surface situation.

FIG. 16 is a diagram illustrating the vehicle 81 that is caused to start by the start torque suppression control. FIG. 16 illustrates a situation in which the accelerator pedal is depressed to cause the vehicle 81 to start from a stopped state in which, for example, the right front wheel 82R, the left rear wheel 83L, and the right rear wheel 83R are stopped on an icy road surface and the left front wheel 82L is stopped on a snowy road surface. Accordingly, in the example illustrated in FIG. 16, the left front wheel 82L exhibiting the largest friction coefficient may be set as the reference wheel WH, and the other wheels, i.e., the right front wheel 82R, the left rear wheel 83L, and the right rear wheel 83R, may be set as the wheels WL1 to WL3. The smoothing factor ksh may be set for the left front motor 84 that drives the left front wheel 82L, and the delay times Td1 to Td3 may be set for the right front motor 85, the left rear motor 86, and the right rear motor 87 that drive the other wheels.

As represented by a state immediately after the start in FIG. 16, a power running torque Tfl of the left front motor 84 may be increased prior to power running torques of the other traveling motors, because, for example, the right front wheel 82R, the left rear wheel 83L, and the right rear wheel 83R are stopped on the icy road surface and the left front wheel 82L is stopped on the snowy road surface. Thus, a driving force Ffl may be given to the left front wheel 82L in contact with the snowy road surface less slippery than the icy road surface, whereas driving forces for the other wheels 82R, 83L, and 83R in contact with the icy road surface more slippery than the snowy road surface may be controlled to be zero. This makes it possible to cause the wheels 82R, 83L, and 83R on the low-μ side to rotate in conjunction with the vehicle speed to prevent them from slipping, while causing the vehicle 81 to start by giving the driving force Ffl to the left front wheel 82L on the high-μ side. In a case where the vehicle 81 is thus caused to start, after the wheels 82R, 83L, and 83R rotate for the delay times Td1 to Td3, driving forces Ffr, Frl, and Frr may be given to the rotating wheels 82R, 83L, and 83R by increasing power running torques Tfr, Trl, and Trr of the other traveling motors 85 to 87, as represented by a state after elapse of a predetermined period of time in FIG. 16. This makes it possible to suppress slip of the wheels 82R, 83L, and 83R in contact with, for example, the icy road surface, making it possible to stabilize the vehicle behavior at the start.

In the vehicle control apparatus 80, of the wheels 82L, 82R, 83L, and 83R, one wheel may serve as the first wheel, and another wheel may serve as the second wheel. Of the motors 84 to 87, one motor may serve as the first traveling motor, and another motor may serve as the second traveling motor. Of the delay times Td1 to Td3, one delay time may serve as the first delay time, and another delay time may serve as the second delay time. Of the friction coefficients FLμ, FRμ, RLμ, and RRμ, one friction coefficient may serve as the first friction coefficient, and another friction coefficient may serve as the second friction coefficient.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In the above description, the control system 20 may be configured by the plurality of control units including the battery control unit 34, the front motor control unit 40, the rear motor control unit 41, the camera control unit 44, the brake control unit 51, and the vehicle control unit 52, and the control system 98 may be configured by the plurality of control units including the battery control unit 34, the camera control unit 44, the brake control unit 51, the vehicle control unit 52, and the motor control units 94 to 97. However, this is a non-limiting example. In some embodiments, each of the control systems 20 and 98 may be configured by one control unit. Each of the vehicles 11 and 81 is not limited to an electric vehicle according to an illustrated example embodiment, and may be a fuel cell vehicle or a series hybrid vehicle.

Although the technology may be applied to the all-wheel-drive vehicles 11 and 81 in the above description, this is a non-limiting example. The technology may be applied to a front-wheel-drive or rear-wheel-drive vehicle serving as the vehicle 11. For example, in a front-wheel-drive vehicle, the first traveling motor may be coupled to a left front wheel serving as the first wheel, and the second traveling motor may be coupled to a right front wheel serving as the second wheel. In this case, the smoothing factor ks and the delay time Td may be set in accordance with the friction coefficients of the road surfaces with which the left and right front wheels are in contact, and the start torque suppression control described above may be executed. Similarly, in a rear-wheel-drive vehicle, the first traveling motor may be coupled to a left rear wheel serving as the first wheel, and the second traveling motor may be coupled to a right rear wheel serving as the second wheel. In this case, the smoothing factor ks and the delay time Td may be set in accordance with the friction coefficients of the road surfaces with which the left and right rear wheels are in contact, and the start torque suppression control described above may be executed.

In the above description, the image analysis of the imaging data obtained by the camera modules 43L and 43R may be executed to determine the road surface situation, and the friction coefficient between the wheel and the road surface may be estimated on the basis of the determined road surface situation (e.g., a dry road surface, a wet road surface, a snowy road surface, or an icy road surface). However, this is a non-limiting example. For example, the friction coefficient between the wheel and the road surface may be estimated on the basis of the regenerative torque of the traveling motor immediately before a stop and an angular acceleration of the wheel coupled to the traveling motor. At a timing when the wheel starts to lock due to the regenerative torque of the traveling motor, the angular acceleration of the wheel may suddenly increase toward deceleration. Accordingly, it is possible to estimate the friction coefficient between the wheel and the road surface, on the basis of the regenerative torque at the timing when the angular acceleration of the wheel suddenly increases toward deceleration. For example, on a road surface with a small friction coefficient, such as an icy road surface, a small regenerative torque may be exhibited when the angular acceleration of the wheel suddenly increases toward deceleration. On a road surface with a large friction coefficient, such as a dry road surface, a large regenerative torque may be exhibited when the angular acceleration of the wheel suddenly increases toward deceleration.

According to the vehicle control apparatus of at least one embodiment of the technology, when the vehicle starts in a situation in which the first friction coefficient, the second friction coefficient, or both are less than the first threshold and the difference between the first friction coefficient and the second friction coefficient is greater than the second threshold, the power running torque of the first traveling motor is increased after elapse of the first delay time after the power running torque of the second traveling motor is increased, in a case where the first friction coefficient is smaller than the second friction coefficient. The first delay time is set on the basis of the first friction coefficient. This makes it possible to suppress wheel slip at the start of the vehicle.

Each of the control system 20 illustrated in FIG. 2 and the control system 98 illustrated in FIG. 12 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the control system 20 and the control system 98. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the control system 20 illustrated in FIG. 2 and the control system 98 illustrated in FIG. 12.

The invention claimed is:

1. A vehicle control apparatus to be applied to a vehicle, the vehicle control apparatus comprising:
   a first traveling motor coupled to a first wheel of the vehicle;
   a second traveling motor coupled to a second wheel of the vehicle; and
   a control system including a processor and a memory communicably coupled to each other, the control system being configured to control the first traveling motor and the second traveling motor, wherein
   the control system is configured to estimate a first friction coefficient between the first wheel and a road surface and a second friction coefficient between the second wheel and a road surface, and, in a case where the vehicle starts in a situation in which the first friction coefficient, the second friction coefficient, or both are less than a first threshold and a difference between the first friction coefficient and the second friction coefficient is greater than a second threshold, the control system is configured to increase a power running torque of the first traveling motor after elapse of a first delay time after increasing a power running torque of the second traveling motor, in a case where the first friction coefficient is smaller than the second friction coefficient, the first delay time being set on a basis of the first friction coefficient, and increase the power running torque of the second traveling motor after elapse of a second delay time after increasing the power running torque of the first traveling motor, in a case where the second friction coefficient is smaller than the first friction coefficient, the second delay time being set on a basis of the second friction coefficient.

2. The vehicle control apparatus according to claim 1, wherein the first delay time is set longer as the first friction coefficient becomes smaller, and the second delay time is set longer as the second friction coefficient becomes smaller.

3. The vehicle control apparatus according to claim 2, wherein, in a case where the vehicle starts in the situation in which the first friction coefficient, the second friction coefficient, or both are less than the first threshold and the difference between the first friction coefficient and the second friction coefficient is greater than the second threshold, the control system is configured to control the power running torque of the second traveling motor to a smaller value than a target torque based on a requested driving force, in the case where the first friction coefficient is smaller than the second friction coefficient, and control the power running torque of the first traveling motor to a smaller value than the target torque based on the requested driving force, in the case where the second friction coefficient is smaller than the first friction coefficient.

4. The vehicle control apparatus according to claim 3, wherein, in a case where the vehicle starts in a situation in which the first friction coefficient, the second friction coefficient, or both are less than the first threshold and the difference between the first friction coefficient and the second friction coefficient is equal to or less than the second threshold, the control system is configured to control the power running torque of the first traveling motor to a smaller value than the target torque based on the requested driving force, and control the power running torque of the second traveling motor to a smaller value than the target torque based on the requested driving force.

5. The vehicle control apparatus according to claim 4, wherein the power running torque of the first traveling motor becomes smaller as the first friction coefficient becomes smaller, and the power running torque of the second traveling motor becomes smaller as the second friction coefficient becomes smaller.

6. The vehicle control apparatus according to claim 3, wherein the power running torque of the first traveling motor becomes smaller as the first friction coefficient becomes smaller, and the power running torque of the second traveling motor becomes smaller as the second friction coefficient becomes smaller.

7. The vehicle control apparatus according to claim 2, wherein, in a case where the vehicle starts in a situation in which the first friction coefficient, the second friction coefficient, or both are less than the first threshold and the difference between the first friction coefficient and the second friction coefficient is equal to or less than the second threshold, the control system is configured to control the power running torque of the first traveling motor to a smaller value than a target torque based on a requested driving force, and control the power running torque of the second traveling motor to a smaller value than the target torque based on the requested driving force.

8. The vehicle control apparatus according to claim 7, wherein the power running torque of the first traveling motor becomes smaller as the first friction coefficient becomes smaller, and the power running torque of the second traveling motor becomes smaller as the second friction coefficient becomes smaller.

9. The vehicle control apparatus according to claim 1, wherein, in a case where the vehicle starts in the situation in which the first friction coefficient, the second friction coefficient, or both are less than the first threshold and the difference between the first friction coefficient and the second friction coefficient is greater than the second threshold, the control system is configured to control the power running torque of the second traveling motor to a smaller value than a target torque based on a requested driving force, in the case where the first friction coefficient is smaller than the second friction coefficient, and control the power running torque of the first traveling motor to a smaller value than the target torque based on the requested driving force, in the case where the second friction coefficient is smaller than the first friction coefficient.

10. The vehicle control apparatus according to claim 9, wherein, in a case where the vehicle starts in a situation in which the first friction coefficient, the second friction coefficient, or both are less than the first threshold and the difference between the first friction coefficient and the second friction coefficient is equal to or less than the second threshold, the control system is configured to
control the power running torque of the first traveling motor to a smaller value than the target torque based on the requested driving force, and
control the power running torque of the second traveling motor to a smaller value than the target torque based on the requested driving force.

11. The vehicle control apparatus according to claim 10, wherein
the power running torque of the first traveling motor becomes smaller as the first friction coefficient becomes smaller, and
the power running torque of the second traveling motor becomes smaller as the second friction coefficient becomes smaller.

12. The vehicle control apparatus according to claim 9, wherein
the power running torque of the first traveling motor becomes smaller as the first friction coefficient becomes smaller, and
the power running torque of the second traveling motor becomes smaller as the second friction coefficient becomes smaller.

13. The vehicle control apparatus according to claim 1, wherein,
in a case where the vehicle starts in a situation in which the first friction coefficient, the second friction coefficient, or both are less than the first threshold and the difference between the first friction coefficient and the second friction coefficient is equal to or less than the second threshold,
the control system is configured to
control the power running torque of the first traveling motor to a smaller value than a target torque based on a requested driving force, and
control the power running torque of the second traveling motor to a smaller value than the target torque based on the requested driving force.

14. The vehicle control apparatus according to claim 13, wherein
the power running torque of the first traveling motor becomes smaller as the first friction coefficient becomes smaller, and
the power running torque of the second traveling motor becomes smaller as the second friction coefficient becomes smaller.

15. A vehicle control apparatus to be applied to a vehicle, the vehicle control apparatus comprising:
a first traveling motor coupled to a first wheel of the vehicle;
a second traveling motor coupled to a second wheel of the vehicle; and
circuitry configured to control the first traveling motor and the second traveling motor, wherein
the circuitry is configured to estimate a first friction coefficient between the first wheel and a road surface and a second friction coefficient between the second wheel and a road surface, and,
in a case where the vehicle starts in a situation in which the first friction coefficient, the second friction coefficient, or both are less than a first threshold and a difference between the first friction coefficient and the second friction coefficient is greater than a second threshold,
the circuitry is configured to
increase a power running torque of the first traveling motor after elapse of a first delay time after increasing a power running torque of the second traveling motor, in a case where the first friction coefficient is smaller than the second friction coefficient, the first delay time being set on a basis of the first friction coefficient, and
increase the power running torque of the second traveling motor after elapse of a second delay time after increasing the power running torque of the first traveling motor, in a case where the second friction coefficient is smaller than the first friction coefficient, the second delay time being set on a basis of the second friction coefficient.

* * * * *